United States Patent
Hart et al.

(10) Patent No.: US 8,725,965 B2
(45) Date of Patent: May 13, 2014

(54) SYSTEM SETUP FOR ELECTRONIC BACKUP

(75) Inventors: David Hart, San Francisco, CA (US);
Christopher Wolf, Raleigh, NC (US);
Pavel Cisler, Los Gatos, CA (US);
Robert Ulrich, San Jose, CA (US);
Kevin Tiene, Cupertino, CA (US); Mike Metas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 762 days.

(21) Appl. No.: 11/760,632

(22) Filed: Jun. 8, 2007

(65) Prior Publication Data
US 2008/0307175 A1   Dec. 11, 2008

(51) Int. Cl.
*G06F 12/00* (2006.01)
*G06F 13/00* (2006.01)

(52) U.S. Cl.
USPC .............. 711/162; 711/1; 711/100; 711/154; 711/165

(58) Field of Classification Search
USPC .......... 717/168–272, 5, 718; 711/1, 100, 154, 711/161, 162, 165; 714/5, 718
See application file for complete search history.

(56) References Cited

U.S. PATENT DOCUMENTS

| | | | |
|---|---|---|---|
| 5,150,473 A | 9/1992 | Zulch | |
| 5,163,148 A | 11/1992 | Walls | |
| 5,276,867 A | 1/1994 | Kenley et al. | |
| 5,349,658 A | 9/1994 | O'Rourke et al. | |
| 5,369,570 A | 11/1994 | Parad | |
| 5,664,186 A | 9/1997 | Bennett et al. | |
| 5,680,562 A | 10/1997 | Conrad et al. | |
| 5,736,974 A | 4/1998 | Selker | |
| 5,745,669 A | 4/1998 | Hugard et al. | |
| 5,754,178 A | 5/1998 | Johnston et al. | |
| 5,758,359 A | 5/1998 | Saxon | |
| 5,790,120 A | 8/1998 | Lozares et al. | |
| 5,818,936 A | 10/1998 | Mashayekhi | |
| 5,819,032 A | 10/1998 | De Vries et al. | |
| 5,819,292 A | 10/1998 | Hitz et al. | |
| 5,831,617 A | 11/1998 | Bhukhanwala | |
| 5,832,526 A | 11/1998 | Schuyler | |
| 5,961,605 A | 10/1999 | Deng et al. | |
| 5,987,566 A | 11/1999 | Vishlitzky et al. | |
| 6,006,227 A | 12/1999 | Freeman et al. | |

(Continued)

FOREIGN PATENT DOCUMENTS

| | | |
|---|---|---|
| EP | 0629950 | 12/1994 |
| EP | 1152352 | 11/2001 |

(Continued)

OTHER PUBLICATIONS

Windows XP Backup Made Easy, Bott, Ed, Jul. 14, 2003, Microsoft.*

(Continued)

*Primary Examiner* — Tuan Thai
(74) *Attorney, Agent, or Firm* — Fish & Richardson P.C.

(57) ABSTRACT

Systems and methods are provided for storing and restoring digital data. In some implementations, a method is provided. The method includes detecting a remote storage device, prompting the user to use the detected remote storage device for backup operations, receiving a user input to use the detected remote storage device for backup operations, and automatically configuring backup operations using the remote storage device. Other embodiments of this aspect include corresponding systems, apparatus, computer program products, and computer readable media.

6 Claims, 12 Drawing Sheets

(56) References Cited

U.S. PATENT DOCUMENTS

| | | | |
|---|---|---|---|
| 6,023,506 | A | 2/2000 | Ote et al. |
| 6,097,313 | A | 8/2000 | Takahashi et al. |
| 6,112,318 | A | 8/2000 | Jouppi et al. |
| 6,167,532 | A * | 12/2000 | Wisecup ............................ 714/23 |
| 6,188,405 | B1 | 2/2001 | Czerwinski et al. |
| 6,269,381 | B1 | 7/2001 | St. Pierre et al. |
| 6,366,988 | B1 | 4/2002 | Skiba et al. |
| 6,396,500 | B1 | 5/2002 | Qureshi et al. |
| 6,397,308 | B1 * | 5/2002 | Ofek et al. ...................... 711/162 |
| 6,424,626 | B1 | 7/2002 | Kidambi et al. |
| 6,460,055 | B1 | 10/2002 | Midgley et al. |
| 6,604,118 | B2 | 8/2003 | Kleiman et al. |
| 6,625,704 | B2 * | 9/2003 | Winokur ......................... 711/162 |
| 6,629,129 | B1 | 9/2003 | Bookspan et al. |
| 6,636,937 | B2 * | 10/2003 | Peter ................................ 711/103 |
| 6,638,313 | B1 | 10/2003 | Freeman et al. |
| 6,711,572 | B2 | 3/2004 | Zakharov et al. |
| 6,714,201 | B1 | 3/2004 | Grinstein et al. |
| 6,714,952 | B2 | 3/2004 | Dunham et al. |
| 6,725,427 | B2 | 4/2004 | Freeman et al. |
| 6,728,735 | B1 | 4/2004 | Fong |
| 6,768,999 | B2 | 7/2004 | Prager et al. |
| 6,785,751 | B1 | 8/2004 | Connor |
| 6,785,786 | B1 | 8/2004 | Gold et al. |
| 6,801,229 | B1 | 10/2004 | Tinkler |
| 6,857,001 | B2 | 2/2005 | Hitz et al. |
| 6,892,211 | B2 | 5/2005 | Hitz et al. |
| 6,901,493 | B1 * | 5/2005 | Maffezzoni .................... 711/162 |
| 6,918,124 | B1 | 7/2005 | Novik et al. |
| 6,948,039 | B2 * | 9/2005 | Biessener et al. ............. 711/162 |
| 6,959,368 | B1 | 10/2005 | St. Pierre et al. |
| 6,993,710 | B1 | 1/2006 | Coad et al. |
| 7,072,916 | B1 | 7/2006 | Lewis et al. |
| 7,099,900 | B1 | 8/2006 | Bromley et al. |
| 7,103,740 | B1 | 9/2006 | Colgrove et al. |
| 7,107,527 | B2 | 9/2006 | Takahashi et al. |
| 7,111,136 | B2 | 9/2006 | Yamagami |
| 7,133,902 | B2 | 11/2006 | Saha et al. |
| 7,155,486 | B2 | 12/2006 | Aoshima et al. |
| 7,174,352 | B2 | 2/2007 | Kleiman et al. |
| 7,185,028 | B2 | 2/2007 | Lechner |
| 7,200,617 | B2 | 4/2007 | Kibuse |
| 7,222,194 | B2 | 5/2007 | Kano et al. |
| 7,275,075 | B2 * | 9/2007 | Cannon ................................ 1/1 |
| 7,284,190 | B2 | 10/2007 | Chellis et al. |
| 7,318,134 | B1 | 1/2008 | Oliveira et al. |
| 7,386,801 | B1 | 6/2008 | Horvitz et al. |
| 7,418,619 | B1 | 8/2008 | Uhlmann et al. |
| 7,434,177 | B1 | 10/2008 | Ording et al. |
| 7,440,125 | B2 | 10/2008 | Maekawa et al. |
| 7,483,693 | B2 | 1/2009 | Lueng et al. |
| 7,505,762 | B2 | 3/2009 | Onyon et al. |
| 7,518,611 | B2 | 4/2009 | Boyd et al. |
| 7,558,930 | B2 * | 7/2009 | Kitamura et al. ............. 711/163 |
| 7,559,016 | B1 | 7/2009 | Rakowski et al. |
| 7,574,459 | B2 * | 8/2009 | Sen et al. ............................ 1/1 |
| 7,590,668 | B2 | 9/2009 | Kathuria et al. |
| 7,624,133 | B1 | 11/2009 | Ojalvo |
| 7,630,021 | B2 | 12/2009 | Matsuzaka et al. |
| 7,660,817 | B2 | 2/2010 | Smith et al. |
| 7,669,141 | B1 | 2/2010 | Pegg |
| 7,676,689 | B1 | 3/2010 | Shioyama et al. |
| 7,711,771 | B2 | 5/2010 | Kirnos |
| 7,734,594 | B2 | 6/2010 | Wang |
| 7,809,687 | B2 | 10/2010 | Cisler et al. |
| 7,809,688 | B2 | 10/2010 | Cisler et al. |
| 7,853,566 | B2 | 12/2010 | Cisler et al. |
| 7,853,567 | B2 | 12/2010 | Cisler et al. |
| 7,856,424 | B2 | 12/2010 | Cisler et al. |
| 7,860,839 | B2 | 12/2010 | Cisler et al. |
| 7,934,064 | B1 | 4/2011 | Per et al. |
| 8,010,900 | B2 | 8/2011 | Hart et al. |
| 8,099,392 | B2 | 1/2012 | Paterson et al. |
| 8,166,415 | B2 | 4/2012 | Cisler et al. |
| 8,229,897 | B2 | 7/2012 | Cannon et al. |
| 2001/0047368 | A1 | 11/2001 | Oshinsky et al. |
| 2002/0023198 | A1 | 2/2002 | Kokubun et al. |
| 2002/0046220 | A1 | 4/2002 | Freeman et al. |
| 2002/0054158 | A1 | 5/2002 | Asami |
| 2002/0063737 | A1 | 5/2002 | Feig et al. |
| 2002/0080180 | A1 | 6/2002 | Mander et al. |
| 2002/0112237 | A1 | 8/2002 | Kelts |
| 2002/0156921 | A1 | 10/2002 | Dutta et al. |
| 2002/0160760 | A1 | 10/2002 | Aoyama |
| 2002/0174283 | A1 | 11/2002 | Lin |
| 2003/0016248 | A1 | 1/2003 | Hayes Ubillos |
| 2003/0018878 | A1 | 1/2003 | Dorward et al. |
| 2003/0050940 | A1 | 3/2003 | Robinson |
| 2003/0063128 | A1 | 4/2003 | Salmimaa et al. |
| 2003/0065687 | A1 | 4/2003 | Momiji et al. |
| 2003/0097640 | A1 | 5/2003 | Abrams et al. |
| 2003/0122874 | A1 | 7/2003 | Dieberger et al. |
| 2003/0126247 | A1 * | 7/2003 | Strasser et al. ............... 709/223 |
| 2003/0131007 | A1 | 7/2003 | Schirmer et al. |
| 2003/0135650 | A1 | 7/2003 | Kano et al. |
| 2003/0137540 | A1 | 7/2003 | Klevenz et al. |
| 2003/0167380 | A1 | 9/2003 | Green |
| 2003/0172937 | A1 | 9/2003 | Faries et al. |
| 2003/0195903 | A1 | 10/2003 | Manley et al. |
| 2003/0220949 | A1 | 11/2003 | Witt et al. |
| 2004/0066414 | A1 | 4/2004 | Czerwinski et al. |
| 2004/0073560 | A1 | 4/2004 | Edwards |
| 2004/0078641 | A1 | 4/2004 | Fleischmann |
| 2004/0088331 | A1 | 5/2004 | Therrien et al. |
| 2004/0117459 | A1 | 6/2004 | Fry |
| 2004/0125137 | A1 | 7/2004 | Stata et al. |
| 2004/0133575 | A1 * | 7/2004 | Farmer et al. ...................... 707/9 |
| 2004/0139396 | A1 | 7/2004 | Gelernter et al. |
| 2004/0143652 | A1 | 7/2004 | Grannan et al. |
| 2004/0163009 | A1 | 8/2004 | Goldstein et al. |
| 2004/0167942 | A1 | 8/2004 | Oshinsky et al. |
| 2004/0175000 | A1 | 9/2004 | Caronni |
| 2004/0193953 | A1 | 9/2004 | Callahan et al. |
| 2004/0199826 | A1 | 10/2004 | Bertram et al. |
| 2004/0210608 | A1 | 10/2004 | Lee et al. |
| 2004/0220980 | A1 | 11/2004 | Forster |
| 2004/0228493 | A1 | 11/2004 | Ma |
| 2004/0235523 | A1 | 11/2004 | Schrire et al. |
| 2004/0236769 | A1 | 11/2004 | Smith et al. |
| 2004/0236916 | A1 | 11/2004 | Berkowitz et al. |
| 2004/0267700 | A1 | 12/2004 | Dumais et al. |
| 2005/0010955 | A1 | 1/2005 | Elia et al. |
| 2005/0071390 | A1 * | 3/2005 | Midgley et al. ............... 707/204 |
| 2005/0091596 | A1 | 4/2005 | Anthony et al. |
| 2005/0102695 | A1 | 5/2005 | Musser |
| 2005/0108253 | A1 | 5/2005 | Metsatahti et al. |
| 2005/0138081 | A1 | 6/2005 | Alshab et al. |
| 2005/0144135 | A1 | 6/2005 | Juarez et al. |
| 2005/0149577 | A1 | 7/2005 | Okada et al. |
| 2005/0165867 | A1 | 7/2005 | Barton et al. |
| 2005/0187992 | A1 | 8/2005 | Prahlad et al. |
| 2005/0204186 | A1 | 9/2005 | Rothman et al. |
| 2005/0216527 | A1 | 9/2005 | Erlingsson |
| 2005/0246398 | A1 | 11/2005 | Barzilai et al. |
| 2005/0262168 | A1 | 11/2005 | Helliker et al. |
| 2005/0262377 | A1 | 11/2005 | Sim-Tang |
| 2006/0026218 | A1 | 2/2006 | Urmston |
| 2006/0041603 | A1 | 2/2006 | Paterson et al. |
| 2006/0041823 | A1 | 2/2006 | Wolfgang et al. |
| 2006/0053332 | A1 * | 3/2006 | Uhlmann et al. .................. 714/2 |
| 2006/0064444 | A1 | 3/2006 | Van Ingen et al. |
| 2006/0064634 | A1 | 3/2006 | Dettinger et al. |
| 2006/0080521 | A1 | 4/2006 | Barr et al. |
| 2006/0085792 | A1 | 4/2006 | Traut |
| 2006/0085817 | A1 | 4/2006 | Kim et al. |
| 2006/0101384 | A1 | 5/2006 | Sim-Tang et al. |
| 2006/0106893 | A1 | 5/2006 | Daniels et al. |
| 2006/0117309 | A1 | 6/2006 | Singhal et al. |
| 2006/0137010 | A1 | 6/2006 | Kramer et al. |
| 2006/0143250 | A1 | 6/2006 | Peterson et al. |
| 2006/0150107 | A1 | 7/2006 | Leung et al. |
| 2006/0156246 | A1 | 7/2006 | Williams et al. |
| 2006/0161861 | A1 | 7/2006 | Holecek et al. |
| 2006/0218363 | A1 | 9/2006 | Palapudi |

(56) References Cited

U.S. PATENT DOCUMENTS

| | | | |
|---|---|---|---|
| 2006/0248294 A1* | 11/2006 | Nedved et al. | 711/162 |
| 2006/0253470 A1 | 11/2006 | Friedman et al. | |
| 2007/0027935 A1 | 2/2007 | Haselton et al. | |
| 2007/0030528 A1 | 2/2007 | Quaeler et al. | |
| 2007/0038884 A1 | 2/2007 | Campbell et al. | |
| 2007/0043790 A1 | 2/2007 | Kryger | |
| 2007/0070066 A1 | 3/2007 | Bakhash | |
| 2007/0078910 A1 | 4/2007 | Bopardikar | |
| 2007/0088702 A1 | 4/2007 | Fridella et al. | |
| 2007/0094312 A1 | 4/2007 | Sim-Tang | |
| 2007/0106978 A1 | 5/2007 | Felts | |
| 2007/0136381 A1 | 6/2007 | Cannon et al. | |
| 2007/0136389 A1 | 6/2007 | Bergant et al. | |
| 2007/0156772 A1 | 7/2007 | Lechner | |
| 2007/0168497 A1 | 7/2007 | Locker et al. | |
| 2007/0185879 A1 | 8/2007 | Roublev et al. | |
| 2007/0185922 A1 | 8/2007 | Kapoor et al. | |
| 2007/0192386 A1 | 8/2007 | Fries et al. | |
| 2007/0266007 A1 | 11/2007 | Arrouye et al. | |
| 2007/0271263 A1 | 11/2007 | Merrild | |
| 2007/0271303 A1 | 11/2007 | Menendez et al. | |
| 2007/0288536 A1 | 12/2007 | Sen et al. | |
| 2008/0016576 A1 | 1/2008 | Ueda et al. | |
| 2008/0022393 A1 | 1/2008 | Waltermann et al. | |
| 2008/0028007 A1 | 1/2008 | Ishii et al. | |
| 2008/0033922 A1 | 2/2008 | Cisler et al. | |
| 2008/0033969 A1 | 2/2008 | Koo et al. | |
| 2008/0034004 A1 | 2/2008 | Cisler et al. | |
| 2008/0034011 A1 | 2/2008 | Cisler et al. | |
| 2008/0034013 A1 | 2/2008 | Cisler et al. | |
| 2008/0034016 A1 | 2/2008 | Cisler et al. | |
| 2008/0034017 A1 | 2/2008 | Giampaolo et al. | |
| 2008/0034018 A1 | 2/2008 | Cisler et al. | |
| 2008/0034019 A1 | 2/2008 | Cisler et al. | |
| 2008/0034039 A1 | 2/2008 | Cisler et al. | |
| 2008/0046557 A1 | 2/2008 | Cheng | |
| 2008/0059894 A1 | 3/2008 | Cisler et al. | |
| 2008/0065663 A1 | 3/2008 | Farlee et al. | |
| 2008/0070496 A1 | 3/2008 | Jackson | |
| 2008/0077808 A1 | 3/2008 | Teicher et al. | |
| 2008/0082578 A1 | 4/2008 | Hogue et al. | |
| 2008/0091655 A1 | 4/2008 | Gokhale et al. | |
| 2008/0126441 A1 | 5/2008 | Giampaolo et al. | |
| 2008/0126442 A1 | 5/2008 | Cisler et al. | |
| 2008/0141029 A1 | 6/2008 | Culver | |
| 2008/0168184 A1 | 7/2008 | Freedman et al. | |
| 2008/0168245 A1 | 7/2008 | De Atley et al. | |
| 2008/0168391 A1 | 7/2008 | Robbin et al. | |
| 2008/0172607 A1 | 7/2008 | Baer | |
| 2008/0177961 A1 | 7/2008 | McSharry et al. | |
| 2008/0208630 A1 | 8/2008 | Fors et al. | |
| 2008/0214163 A1 | 9/2008 | Onyon et al. | |
| 2008/0216011 A1 | 9/2008 | Gould | |
| 2008/0229037 A1* | 9/2008 | Bunte et al. | 711/162 |
| 2008/0250342 A1 | 10/2008 | Clark et al. | |
| 2008/0285754 A1 | 11/2008 | Kezmann | |
| 2008/0307000 A1 | 12/2008 | Paterson et al. | |
| 2008/0307017 A1 | 12/2008 | Lyons et al. | |
| 2008/0307018 A1 | 12/2008 | Ulrich et al. | |
| 2008/0307019 A1 | 12/2008 | Weiss et al. | |
| 2008/0307020 A1 | 12/2008 | Ko et al. | |
| 2008/0307333 A1 | 12/2008 | McInerney et al. | |
| 2008/0307347 A1 | 12/2008 | Cisler et al. | |
| 2008/0310633 A1 | 12/2008 | Brown et al. | |
| 2009/0031401 A1 | 1/2009 | Cudich et al. | |
| 2009/0254591 A1 | 10/2009 | Weiss et al. | |
| 2009/0307333 A1 | 12/2009 | Welingkar et al. | |
| 2010/0017855 A1 | 1/2010 | Johnson et al. | |
| 2010/0217929 A1 | 8/2010 | Kirshenbaum et al. | |
| 2011/0016089 A1 | 1/2011 | Freedman et al. | |
| 2011/0083088 A1 | 4/2011 | Cisler et al. | |
| 2011/0083098 A1 | 4/2011 | Cisler et al. | |
| 2011/0087976 A1 | 4/2011 | Cisler et al. | |
| 2011/0302502 A1 | 12/2011 | Hart et al. | |
| 2012/0124507 A1 | 5/2012 | Paterson et al. | |
| 2012/0198383 A1 | 8/2012 | Cisler et al. | |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2005/045756 | 5/2005 |
| WO | 2008/019237 | 2/2008 |

OTHER PUBLICATIONS

Microsoft Windows XP System Restore, Harder, Bobbie, Apr. 2001, MSDN.*

How to Interpret Windows Installer Logs; Richard; retrieved from http://blogs.technet.com/richard_macdonald/archive/2007/04/02/How-to-Interpret-Windows-Installer-Logs.aspx; published Apr. 4, 2007.*

StorageSync: Backup, Restore, & Synchronization Software User's Guide, SimpleTech, 2003.*

Retrospect 6.0: Powerful Backup Program Adds Panther Compatibility and Enterprise Features, Engst, Adam, Jun. 1, 2004, MacWorld.*

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

"Aulaclic: Unit 6. The Recycle Bin," Nov. 2005 [online] [retrieved on Nov. 26, 2007] Retrieved from the Internet:<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www.crn.com/white-box/161502165.

"What's New in Word 2002." Wellesly College Information Services Computing Documentation, Jan. 2002, http://www.wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

"MSDN Academic Alliance Developer Center, Curriculum Repository Glossary," [online]. Retrieved from the Internet <URL: http://www.academicresourcecenter.net/curriculum/glossary.aspx>, retrieved on Apr. 22, 2009, 4 pages.

International Search Report and Written Opinion, PCT/US2008/066212, Mar. 9, 2009, 26 pages.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

Communication pursuant to Article 94(3) EPC for Application No. EP 07 799 899.5, dated Oct. 7, 2009, 4 pages.

(56) References Cited

OTHER PUBLICATIONS

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

Microsoft-TechNet, "Using Encrypting File System," Nov. 3, 2005, Microsoft, 40 pages.

Extended International Search Report and Written Opinion, EP 11171738.5, Aug. 29, 2011, 5 pages.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Examination Report from European Application No. 07 813 605.8 dated Oct. 27, 2011, 5 pages.

Examination Report from European Application No. 07 813 540.7 dated Oct. 27, 2011, 5 pages.

Extended European Search Report, European Application No. 11184579.8, Nov. 17, 2011, 6 pages.

Office Action dated Feb. 29, 2012 from related Chinese Application No. 200880024710.0, 11 pages.

Godfrey, Michael et al., "Using Original Analysis to Detect Merging and Splitting of Source Code Entities," IEEE Transactions on Software Engineering, vol. 31, No. 2. Feb. 2005. pp. 166-181.

Communication pursuant to Article 94(3) EPC for Application No. EP 07 813 540.7, dated Jun. 23, 2009, 2 pages.

\* cited by examiner

SYSTEM SETUP FOR ELECTRONIC BACKUP

TECHNICAL FIELD

The disclosed implementations relate generally to storing and restoring digital data.

BACKGROUND

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in .reverse chronological order; that is, the user must first undo the most recently made edit, then the second-most recent one, and so on. If the user saves and closes the document and thereafter opens the document again, it might not be possible to automatically undo any previous edits.

SUMMARY

Systems and methods are provided for storing and restoring digital data. In general, in one aspect, a method is provided. The method includes detecting a remote storage device, prompting the user to use the detected remote storage device for backup operations, receiving a user input to use the detected remote storage device for backup operations, and automatically configuring backup operations using the remote storage device. Other embodiments of this aspect include corresponding systems, apparatus, computer program products, and computer readable media.

Implementations of the aspect can include one or more of the following features. Detecting the remote storage device can include detecting for a first device a remote storage device directly connected to the first device. Detecting the remote storage device can include detecting for a first device a remote storage device coupled to the first device though a wireless connection. Automatically configuring backup operations can include creating one or more disk images on the remote storage device. Automatically configuring backup operations can include setting parameters associated with backup operations to default values. Automatically configuring backup operations can also include configuring communications for transmitting backup data to the remote storage device and receiving archive data stored on the remote storage device.

In general, in one aspect, a system is provided. The system includes a remote storage device and a plurality of client devices, the client devices configured to perform backup operations, the backup operations generating a backup having stored data corresponding to a file system structure, and where each of the client devices perform backup operations to one or more respective disk images on the remote storage device. Other embodiments of this aspect include corresponding systems, apparatus, computer program products, and computer readable media.

Implementations of the aspect can include one or more of the following features. The remote storage device can be coupled to one or more of the plurality of client devices using a wireless base station. The aspect can further include a server that includes the remote storage device and one or more second remote storage devices for storing backup data from the plurality of client devices. The remote storage device can include a plurality of disk images. Each disk image can correspond to a particular client device. A plurality of disk images can be created for individual users of a client device.

In general, in one aspect, a method is provided. The method includes receiving a request from a first client to store first backup data to a storage device, generating a first disk image on the storage device for storing the first backup data, and storing first backup data received from the first client to the first disk image. Other embodiments of this aspect include corresponding systems, apparatus, computer program products, and computer readable media.

Implementations of the aspect can include one or more of the following features. The aspect can further include receiving a request from a second client to store second backup data to the storage device, generating a second disk image on the storage device for storing the second backup data, and storing the second backup data received from the second client to the second disk image. The aspect can further include generating one or more additional first disk images corresponding to individual users from the first client and storing first backup data corresponding to particular users of the first client to the respective first disk image. Storing first backup data can include encrypting the backup data of one or more first disk images.

In general, in one aspect, a system is provided. The system includes a graphical user interface configured to present a preferences menu for a backup application including general preferences and the general preferences including information associated with backup scheduling, the backup scheduling including a user specified retention time for backup data. Other embodiments of this aspect include corresponding systems, apparatus, computer program products, and computer readable media.

In general, in one aspect, a method is provided. The method includes initiating a backup settings interface, selecting one or more preferences for backup operations including a retention time for backup data, and performing one or more backup operations according to the identified preferences, the backup operations generating a backup having stored data corresponding to a file system structure. The method can further include deleting backup data when the retention time has elapsed. Other embodiments of this aspect include corresponding systems, apparatus, computer program products, and computer readable media.

In general, in one aspect, a system is provided. The system includes a graphical user interface configured to present a preferences menu for a backup application including general preferences and the general preferences including information associated with backup operations including selectably excluding data from the backup operations. Other embodiments of this aspect include corresponding systems, apparatus, computer program products, and computer readable media.

Implementations of the aspect can include one or more of the following features. The excluded data can include system files, user selected files, and user selected folders.

In general, in one aspect, a method is provided. The method includes initiating a backup settings interface, receiving a selection of one or more preferences for backup operations including a selection of one or more items for exclusion from backup operations, and performing one or more backup operations according to the identified preferences, the backup operations generating a backup having stored data corresponding to a file system structure where the stored data excludes the selected items. The receiving a selection of items for exclusion can further include providing an interface for browsing a file system for items to exclude. Other embodiments of this aspect include corresponding systems, apparatus, computer program products, and computer readable media.

In general, in one aspect, a system is provided. The system includes a graphical user interface configured to present a preferences menu including general preferences and restore install preferences and the restore install preferences including installs stored by backup operations and available for restoration. Other embodiments of this aspect include corresponding systems, apparatus, computer program products, and computer readable media.

In general, in one aspect, a method is provided. The method includes initiating a backup settings interface, presenting one or more installations available for restoration, each installation associated with a particular application, receiving a user selection of an installation to restore, and restoring the associated application using the selected installation. Other embodiments of this aspect include corresponding systems, apparatus, computer program products, and computer readable media.

Implementations of the aspect can include one or more of the following features. Restoring the associated application can include performing an uninstall of a current version of the associated application prior to the restoration. The aspect can further include identifying installations during install processes and storing a backup of the identified installations.

Particular embodiments of the subject matter described in this specification can be implemented to realize one or more of the following advantages. Backup devices can be identified and configured for backup operations automatically without the user providing settings information. Additionally, multiple users can store backup data to a remote storage location including across a wireless network. A user can quickly restore an install, e.g., for a particular application, using a backup component instead of using an install disk.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
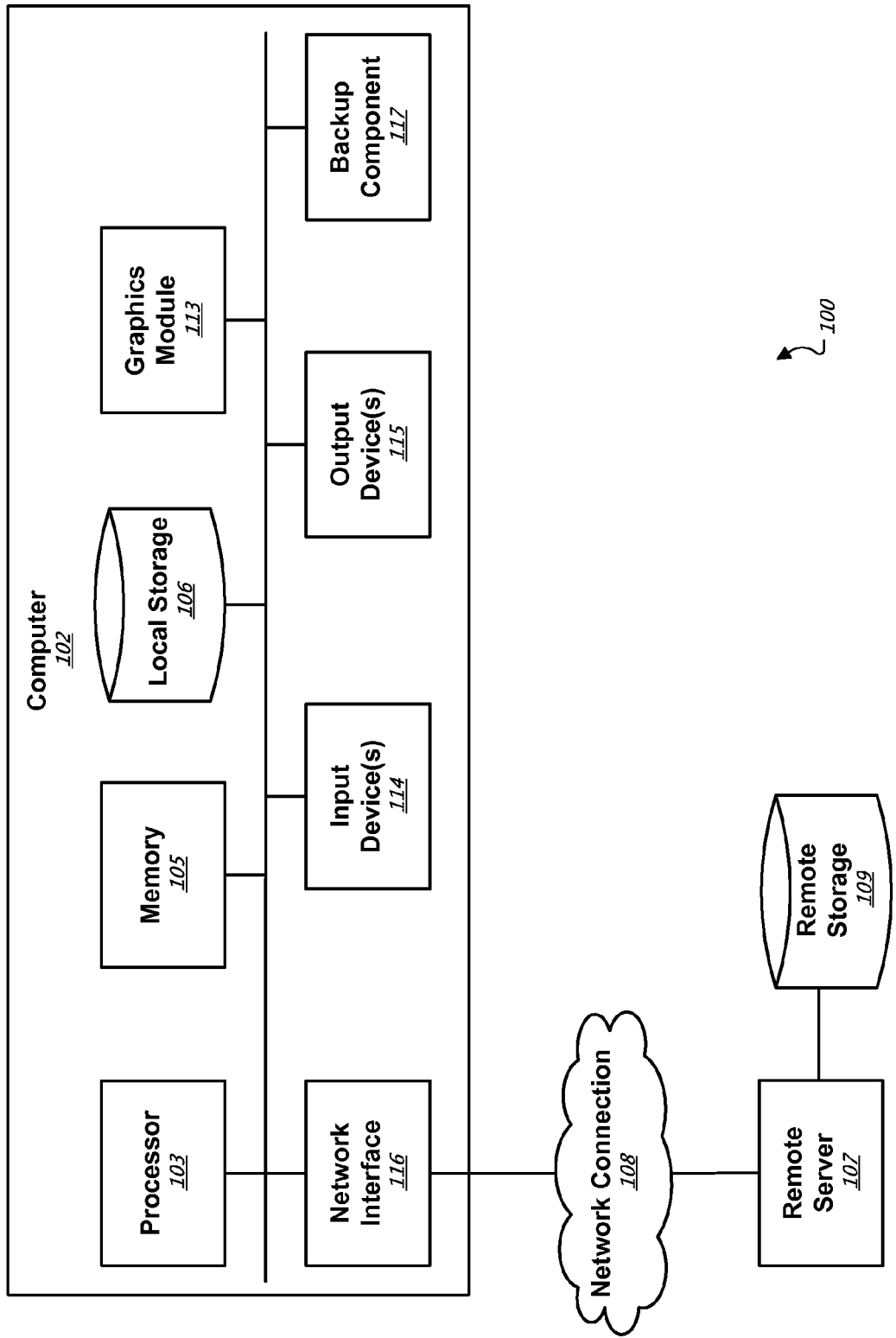
FIG. 1 is a block diagram of an example system.

FIG. 1 is a block diagram of an example system 100. The system 100 can be used for backup operations including capturing at least one earlier version of a user interface view and allowing a user to initiate a restoration based on the captured earlier version. As used herein, a view refers to an item, element or other content, capable of being presented in a user interface, that can be subjected to a backup operation by a backup component 117 included in system 100. For example, a user interface view can contain any number of icons, files, folders, application state information and/or machine state information, etc.

The system 100 includes a personal computer 102, communicatively coupled to a remote server 107 using a network interface 116, and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 using the input and output devices 114, 115. The system 100 includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer-readable medium can be a machine-readable storage device, a machine-readable storage substrate, a memory device, a composition of matter effecting a machine-readable propagated signal, or a combination of one or more of them.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). The systems and methods can be stand alone, or otherwise integrated into a more comprehensive application. In the materials presented below, an integrated system and method for modifying a user interface view is disclosed. However, one of ordinary skill in the art will recognize that the engines, methods, processes and the like that are described can themselves be an individual process or application, part of an operating system or application, a plug-in or the like.

In some implementations, the systems and methods can be implemented as one or more plug-ins that are installed and run on the personal computer 102. The plug-ins are configured to interact with an operating system (e.g., MAC OS™ X, WINDOWS XP, LINUX, etc.) and to perform the various functions, as described with below.

A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 (e.g., a backup daemon) that allows for the storage of versions of the computer's files or other items (e.g., restoring a view including past state of a file, application, application data, parameters, settings, and the like), for example within the local storage device 106 or in an external storage repository or a networked storage device such as the remote storage device 109. In some implementations, the backup component 117 also allows a user to select any of the stored versions and use it to initiate a restoration of that version in the computer.

Figure 2:
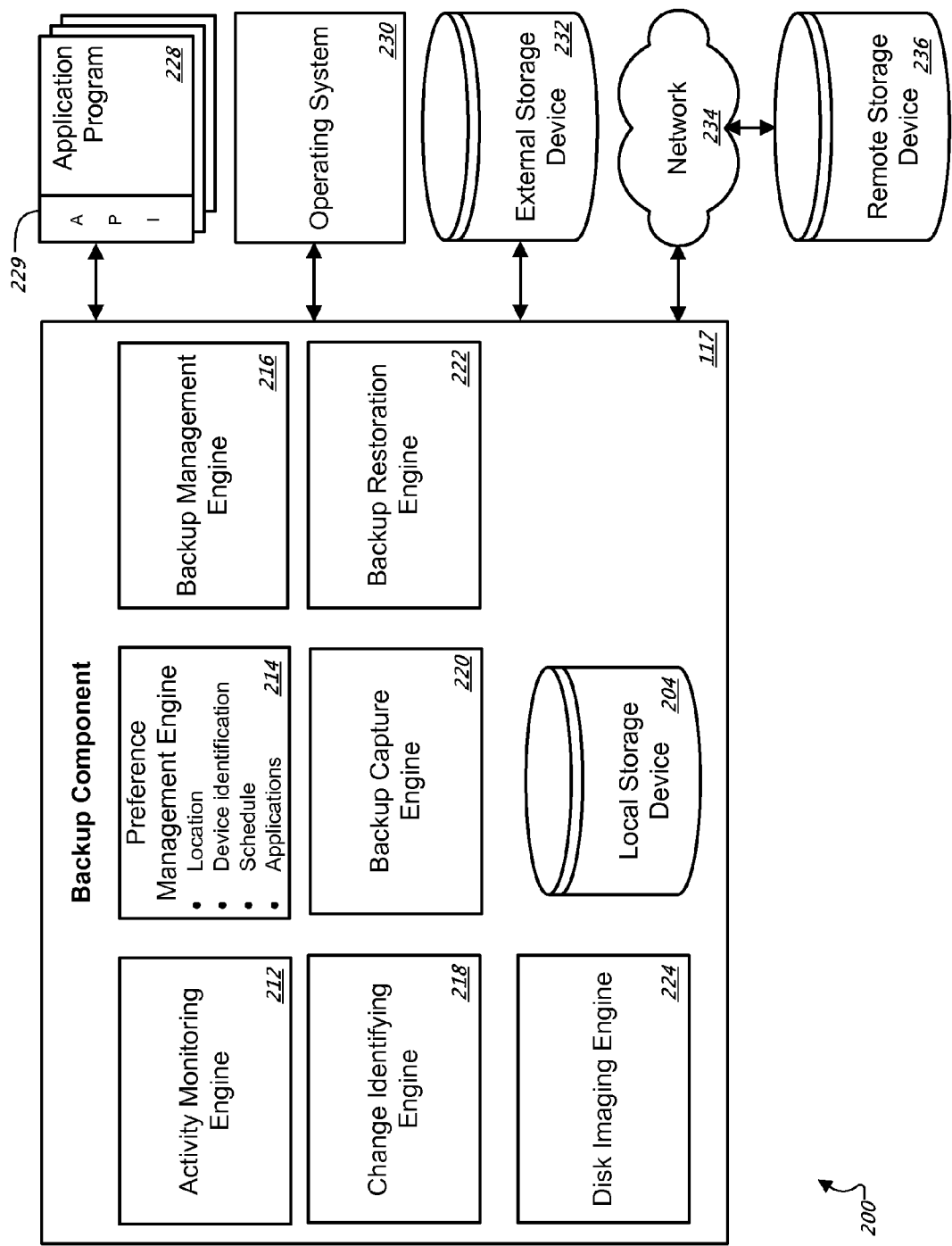
FIG. 2 is a block diagram of an example architecture for backing up and restoring application files.

FIG. 2 is a block diagram of an example architecture 200 for providing the archival and restoration of data. The data (e.g., application files, application data, settings, parameters or the like), can be associated with a set of applications 228.

In one implementation, the backup component 117 provides back up and restoration capability for the system 100. Many different items or elements can be the subject of a backup operation in the system 100. For example, folders, files, items, information portions, directories, images, system parameters, playlists, address books, e-mails, e-mail folders, application states, and the like all can be candidates for inclusion in an archive as backup data. Other types of data can be included as backup data.

In some implementations, the backup component 117 includes a storage device 204 (e.g., a local storage device), a storage device 232 (e.g., an external storage device), and a storage device 236 (e.g., a remote storage device). Versions can be stored on any or all storage devices 204, 242, 236. Any number of local, external, and/or remote storage devices can be used by the backup component 117 for storing versions. In one implementation, the backup component 117 stores the backup data in a format corresponding to a file system structure. Backup data can be stored incrementally during a backup operation where backup data is periodically written to a particular storage device.

In one implementation, one copy of original data (e.g., folders, files, items, information portions, directories, images, system parameters, playlists, address books, e-mails, e-mail folders, application states, preferences, and the like) is stored in the system as backup data (e.g., an original version of the data). When one or more subsequent sets of backup data, or versions, of the data are generated through subsequent backup operations, the backup data can contain only the differences between a current data version and the prior backup data, thereby saving storage space. In some implementations, the storage devices 204 and 232 can be used to store the original backup data as well as links pointing to the original backup data. The links can be hard links which reference, or point to, physical data, or as another example can be symbolic links that reference another file on the storage device (e.g., by name or location).

In another implementation, the backup component 117 runs as a background task on an operating system 230, where the task is generally not visible to the user. The backup component 117 can be can be configured to run across multiple user accounts.

The backup component 117 includes an activity monitoring engine 212. In some implementations, the activity monitoring engine 212 monitors for changes within an application view (e.g. files) that are targeted for a backup operation. A change can also include the addition of new files or data or the deletion of the same.

In one implementation, the activity monitoring engine 212 is capable of discerning between a substantive change (e.g. the text within a document has been modified) and a non-substantive change (e.g. the play count within an iTunes™ playlist has been updated, or several changes cancel each other out) through the activity monitoring engine's interaction with the applications 228. The activity monitoring engine 212 can, for example, create a list of modified elements (e.g., files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user (e.g., idle time).

A preference management engine 214 specifies some operating parameters of the backup component 117. In one implementation, the preference management engine 214 contains user-specified and/or system default application parameters for the backup component 117. These can include settings for the details of capturing and storing the views. For example, the preference management engine 214 can determine the frequency of backup operations, the storage location for the backup data, the types of elements (e.g., files or other items) that are eligible for inclusion in backup operations, and the events which trigger a backup operation (periodic or event-driven, etc.).

In some implementations, the preference management engine 214 can detect that a new storage device is being added to the system 100 and prompt the user to specify whether it should be included as a backup repository. The new storage device, in some implementations, can be attached to a network device such as the remote storage 236 which is accessible to the backup component 117, e.g., using network connection 234. For example, a user can connect an external storage device to a wireless base station within a wireless network. The backup component 117 can detect the addition of the external storage device and prompt the user to include this device as an archive storage medium.

Files and other items can be scheduled for a backup operation due to location (e.g. everything on the C: drive and within D:/photos), a correlation with specific applications (e.g. all pictures, music, e-mail, address book and system settings), a user selection/identification of specific items, or a combination of strategies. In some implementations, specific items or types of items can be excluded from the backup operations (e.g., system files, temporary directory, or the deleted items folder within an e-mail application). In some implementations, different types of items can be scheduled to be stored on different devices or on different segments of a storage device during a backup operation. For example, the backup component 117 stores the versions with a format corresponding to a file system structure. In some implementations, the file system structure can allow the user to navigate data in the stored archives.

A backup management engine 216 coordinates the collection, storage, and retrieval of view versions performed by the backup component 117. For example, the backup management engine 216 can trigger the activity monitoring engine 212 to watch for activities that satisfy a requirement specified in the preference management engine 214. In some implementations, the backup management engine 216 coordinates the removal of expired snapshot data. For example, a user could set a preference for a retention time archived backup data. Once snapshot data has aged beyond the retention time period, the backup management engine 216 can remove the expired snapshot data.

As used herein, a snapshot refers to a backup data stored in an archive that corresponds to a particular view (e.g., of the file system, an application, or other view) taken at a particular point in time. The snapshot can include elements (e.g., items, files, state information) associated with the view as specified by the backup component 117.

A change identifying engine 218 locates specific views or other items within to determine if they have changed. The change identifying engine 218 can be capable of discerning a substantive change from a non-substantive change, similar to the example described above for the activity monitoring engine 212. In some implementations, the change identifying engine 218 traverses a target set of files, data, or other items, comparing a previous version to the current version to determine whether or not a modification has occurred.

A backup capture engine 220 locates files, data, or other items that are to be backed up. The backup capture engine 220 can invoke the activity monitoring engine 212 and/or the change identifying engine 218, for example, to generate a capture list. The backup capture engine 220 can then store copies of these elements in one or more targeted storage repositories. The backup capture engine 220 can track multiple versions of each item included in the backup repository.

The backup component 117 includes a backup restoration engine 222 to restore previous views (e.g. versions of files, data, or other items). In some implementations, the backup restoration engine 222 provides a user interface (e.g., a graphical user interface) where a user can select the item(s) to be restored. In some implementations, the backup restoration engine 222 can be used to reinstall damaged or previously removed applications.

A disk imaging engine 224 can create one or more disk images within a selected storage device, e.g., to be used as an archival storage location for backup data from a particular source (e.g., local storage device or data for a particular user). In some implementations, a disk image is automatically sized and allocated when a user selects an archive storage location. For example, the size of the disk image can depend on the size of other disk images on the selected storage device as well as the overall size of the selected storage device.

A user can specify an archive storage location, for example, through the preference management engine 214. In some implementations, the preference management engine 214 allows the user to assign parameters associated with the creation of disk images. For example, a user can specify the default image size, drive label (e.g., backup files to the B: drive), or the steps to take when the selected storage location is running out of space. In some implementations, the backup component 117 works with an external disk imaging application rather than using the disk imaging engine 224. For example, a remote storage location can include a disk imaging engine 224 for creating disk images from multiple source devices in response to communication from respective backup components 117.

The archived copies can be compressed and/or encrypted. An example of a compression technique is the ZIP file format for data compression and archiving. An example of an encryption technique is the RSA algorithm for public key encryption. Other compression techniques or encryption techniques can be used.

In some implementations, if multiple users make use of the backup component 117 on a single system, each user can select to keep separate archives. In alternative implementations, individual users of the same system can share a disk image on a remote storage device for backup operations. Access to an individual user's archives can be password protected or otherwise held in a secure manner (e.g., each user can have a secure disk image). In various implementations, the archive storage structure mimics a typical file system structure, such that the archived versions can be perused using a standard file system viewing utility.

Figure 3:
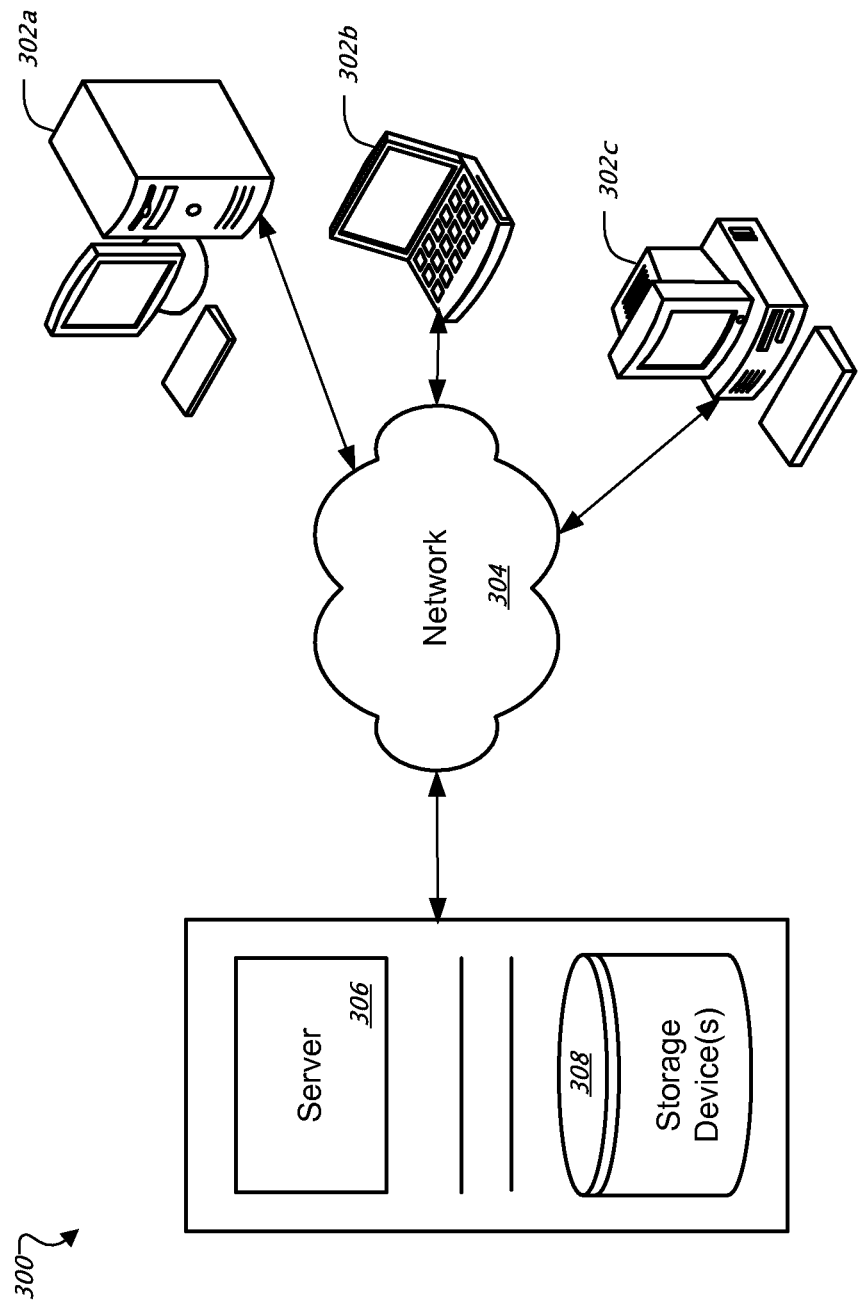
FIG. 3 is a block diagram of an example system for connecting electronic devices to a remote storage device.

FIG. 3 is a block diagram of an example system 300 for connecting electronic devices to a remote storage device. As shown in FIG. 3, three devices 302 (e.g., computers, PDA's, mobile phones, etc) are connected to a network 304. The network 304 can be any type of internetworking access setup (e.g., Local Area Network (LAN), Wide Area Network (WAN), Campus Area Network (CAN), Metropolitan Area Network (MAN), etc.). The devices 302 can be connected to the network 304 over one or more transmission media including, without limitation, Digital Subscriber Line (DSL) or modem internet access using a Public Switched Telephony Network (PSTN), wireless microwave broadband internet access (WiMAX), fiber optic cable internet access (FTTC/H Ethernet), wireless personal access networking (WiFi/Bluetooth), or digital mobile telephony access (GSM over IP, UMTS over IP).

The devices can communicate with a remote server 306 through the network 304. The remote server 306 contains or can communicate with one or more storage devices 308. The storage device(s) 308 can be any storage media (e.g., optical disks, CD ROMs, magnetic optical disks, read only memories (ROMs), random access memories (RAMs), magnetic or optical cards, or any type of media suitable for storing electronic data). The remote server 306 can be running any operating system (e.g., Mac OS, Windows, Linux, etc.) and any application-level network protocol which aids in the sharing of files and other data (e.g., Apple Filing Protocol (AFP), Server Message Block (SMB), Network File System (NFS), etc.). Additionally, the remote server 306 can support any disk file system (e.g., Hierarchical File System (HFS, HFS+), New Technology File System (NTFS), Third Extended File System (ext3), Universal Disk Format (UDF), etc.).

In some implementations, the devices 302 can share space within the storage devices 308 by creating disk images within the storage devices 308. A disk image can be a file within a storage medium which acts as a virtual disk drive. For example, a storage device can be separated into portions, each accessible by a different disk drive label. In this way, each device 302 can receive a dedicated section of one or more storage devices 308. The disk images can then be used, in some implementations, for storing backup archives of data belonging to the device 302.

In some implementations, using respective backup components (e.g., backup component 117 of FIG. 1), the devices 302 can create data archives within the storage device(s) 308 associated with the remote server 306. For example, data can be stored by a computer 302a within a disk image on the storage device 308. At a later time, if data is lost within the computer 302a, the data can be restored by accessing the remote server 306 and retrieving the archived data from the storage device 308 across the network 304. In various implementations, multiple data archives can be collected within the storage device(s) 308, each archive containing changes since the previous data archival task was completed. In this example, multiple versions of data items can be stored within the remote server 306. Any number of computers or other suitable devices 302 can access any number of remote servers 306 using the network 304.

Figure 4:
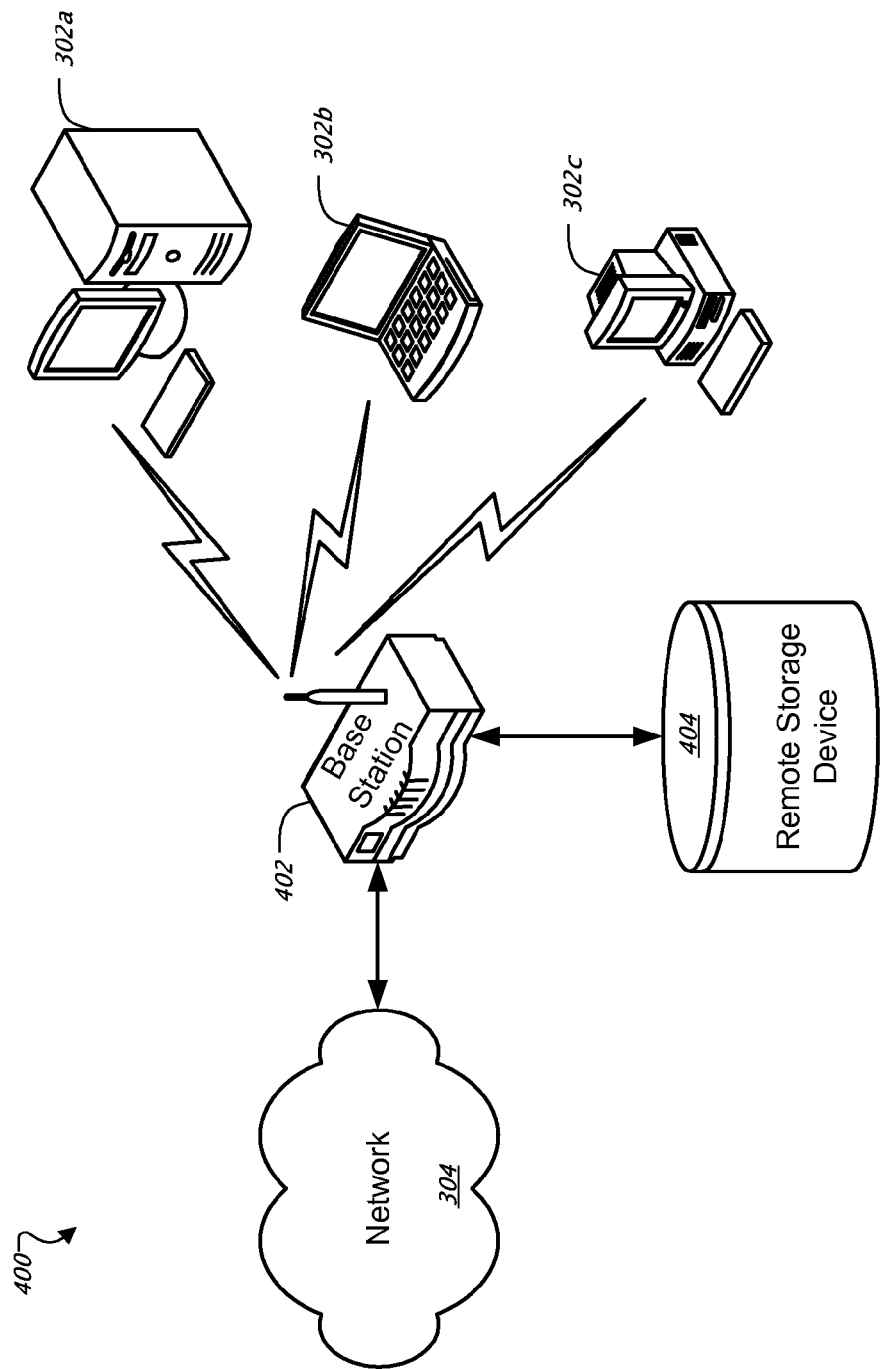
FIG. 4 is a block diagram of an example system for connecting wireless devices to a remote storage device.

FIG. 4 is a block diagram of an example system 400 for connecting wireless devices to a remote storage device. As shown in FIG. 4, the three personal computers 302 are connected to the network 304 through a base station 402. The base station 402 can be any wireless networking device including shareable storage media or through which a shareable external storage device 404 can be attached. For example, an AirPort Extreme wireless base station by Apple Inc. of Cupertino, Calif., in combination with an AirPort Disk can allow an external USB hard drive to be shared by the devices 302 through a wireless network. In some implementations, multiple storage devices 404 can be included within and/or attached to the base station 402.

The base station 402 and the storage device 404 can be treated, in combination, as a remote server, similar to the example shown in FIG. 3. Disk images can be created, in various implementations, within the storage device 404 so that each computer 302 can receive a dedicated segment of the storage device 404 to use for archival purposes. If one or more of the computers 302 are used by multiple users, in some implementations, all users can be backed up as a mirror copy of the disk on the computer 302 within a single disk image. In other implementations, each user is allocated a separate disk image. For example, if one or more users are storing backup data in an encrypted or otherwise secure manner, the disk image itself can be encrypted or otherwise secured. In this example, each user can be allocated an individual encrypted disk image.

In some implementations, each user and/or computer 302 gaining access to the storage device 404 through the base station 402 is allocated the same size disk image, such that the storage device 404 is equally distributed amongst users and/or computers 302. In other implementations, different users and/or computers 302 can be allocated different sizes of disk image storage. For example, a user logging into the base station 402 under administrator status can be provided with a greater amount of disk storage within a disk image than a user with lesser privileges. In some implementations, if a user and/or computer 302 runs out of storage space within the presently allocated disk image, a new disk image can be allocated and/or the current disk image can be resized. Allocation of disk images can be done automatically or through setup options (e.g., by an administrative user).

Figure 5:
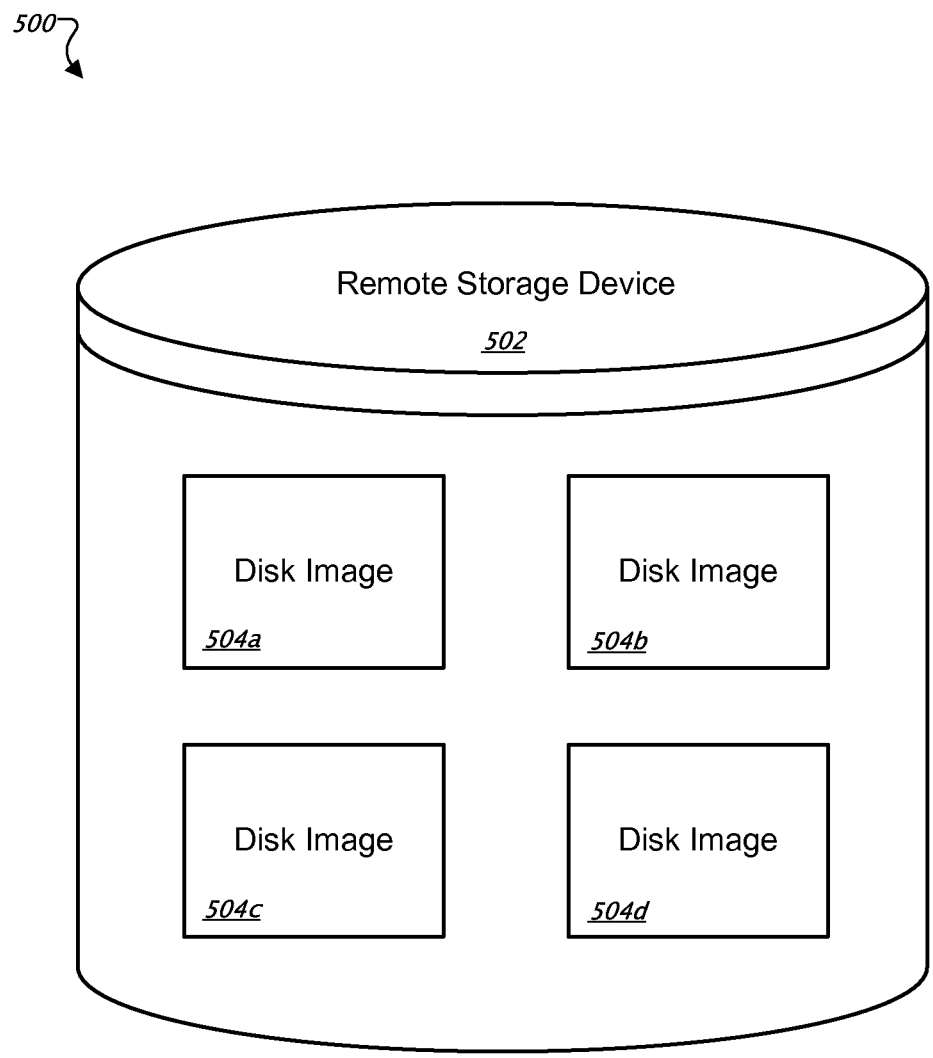
FIG. 5 is a block diagram of an example of creating multiple disk images within a storage device.

FIG. 5 is a block diagram 500 of an example of creating multiple disk images within a storage device 502. The storage device 502 is illustrated as containing four disk images 504. Each disk image 504, as portrayed, is equivalent in size. However, in other implementations any number of disk images 504 can be provided and of varying sizes. In some implementations, the disk images are created using a disk imaging software engine such as the disk imaging engine 224 (FIG. 2). Disk images, in various implementations, can allow multiple users and/or computers or other electronic devices 302 to create virtual storage locations within the single external or remote storage device 502. When the disk image 504 is mounted, its contents are made available to the device 302 as though the disk image 504 were a storage device within or attached to device 302 (e.g., as a standard volume).

In some implementations, disk images 504 are allocated such that a file system structure is available to a remote backup component (e.g., backup component 117 running on devices 302) for purposes of data archival and restoration. For example, an AFP server supporting the HFS+ file system can create disk images within the attached storage device 502 which contain the HFS+ file system architecture. Using a disk image created as described, backup archives can be stored within a file system format.

For example, the backup component 117 running on personal computer 302a could create the disk image 504a using the disk imaging engine 224. During a backup operation, the backup component 117 could then mount the disk image 504a and copy data archives into the file system architecture created within the disk image 504a. Upon initiating a restoration process, the backup component 117 could again mount the disk image 504a to provide the user with access to the data archives stored within. For example, a backup interface can be provided (as described in greater detail below), which allows a user to navigate one or more captured views (e.g., file system, application state) from backup operations.

In some implementations, each disk image 504 is encoded and/or securely protected such that only the owner of each disk image 504 can access the corresponding contents. For example, the backup component 117 can establish security measures for accessing the contents of disk image 504a by a particular user of the computer 302a so that other users of the computer 302a and/or other users on the other electronic devices 302 cannot gain access to the contents of disk image 504a.

Figure 6A:
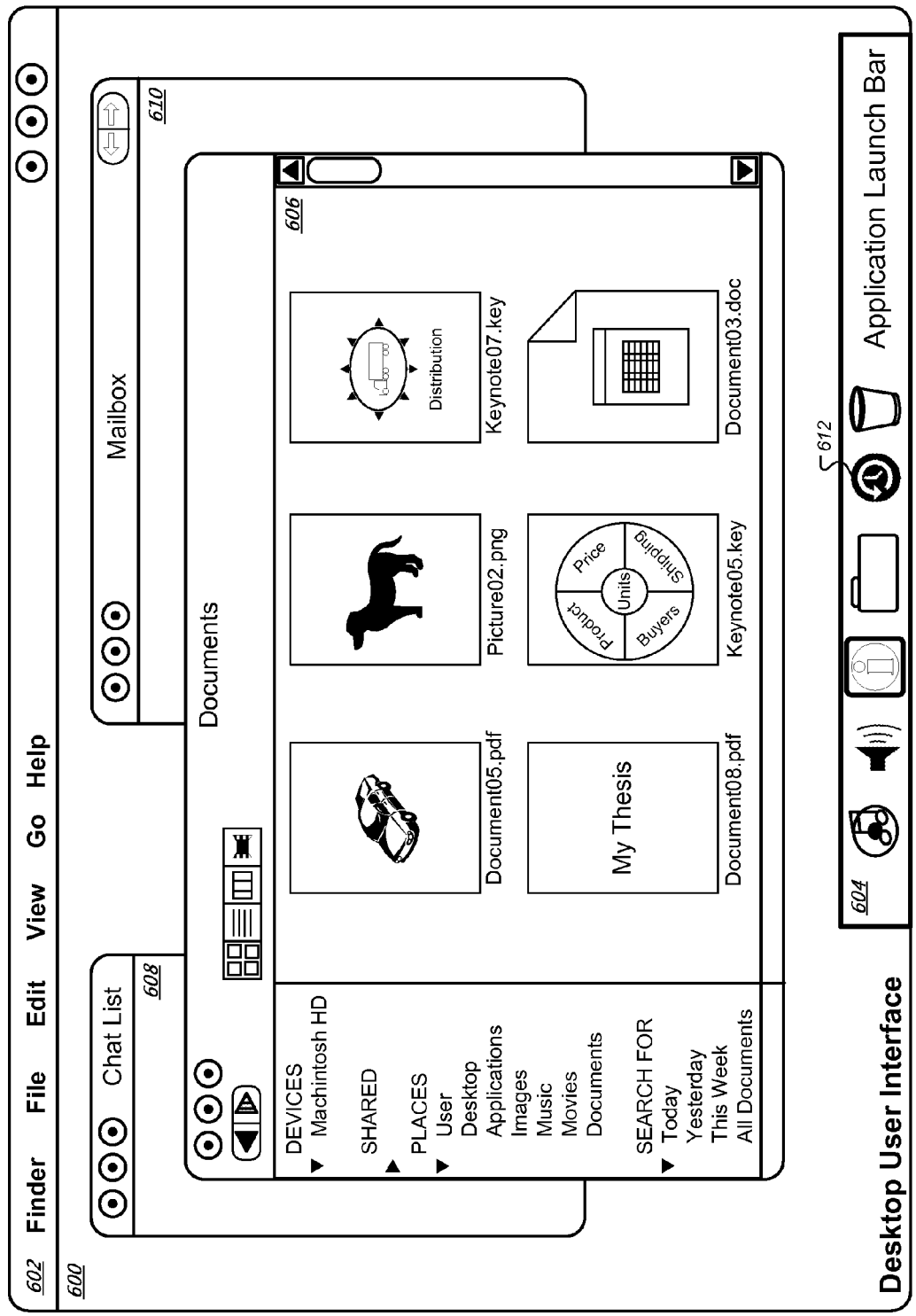
FIG. 6A is a screen shot depicting an example of a desktop user interface with multiple open applications.

FIG. 6A is a screen shot depicting an example of a user interface 600 (e.g., a desktop user interface) with multiple open applications. The user interface 600 can be a user interface as can be provided, e.g., by an operating system. The user interface 600 has a background, a menu bar 602, an application launch bar 604, and may include windows, icons, and other elements. Other configurations are possible. The user interface 600 can have multiple applications running, any or all of which can be presented in a separate graphical window providing an interface for that application. While working with the applications, or at some other time, a user can initiate a backup interface.

The backup interface allows the user to navigate backup data, which as describe above, can be stored remotely as part of one or more disk images. The backup interface can provide visual representations of history views captured during backup operations. Using the backup interface, the user can view items that were previously included, but are now missing from the file navigation application's documents. For example, the user can have made at least one backup of the missing items at an earlier date, and the user can enter the backup interface to search for the items in a backup snapshot of the file navigation application 606 allowing for the restoration of a view corresponding to that prior time.

As shown in FIG. 6A, a user has launched a file navigation application window 606 which is currently presented in the foreground, and a chat application 608 and a mail application 610 that are presented in the background. In particular, the file navigation application 606 is here displaying contents of the user's documents, e.g., a list of the user's files and folders. The file navigation application 606 can be used for accessing, opening, and organizing the files, folders and other digitally stored items within the computer 102.

The backup component can be activated to back up or restore digital content within the file navigation application 606 or another application. In some implementations, the user can activate the backup interface from the user interface using a user-selectable backup interface icon 612 in the application launch bar 604. In some implementations, selection of the backup interface icon 612 launches a backup interface associated with the active application. For example, selection of the backup interface icon 612 while the active window displayed is the file navigation application window 606 can activate the backup interface in which the archived elements associated with the file navigation application 606 are made available for archival and restoration purposes.

As another example, the backup interface can be activated from the menu bar 602. The menu bar 602 can include a backup options menu in addition to the activation selection. The backup options menu can include selections allowing a user to specify data to include or exclude in backup operations. For example, in the file navigation application, the user can identify which content to back up (e.g., individual folders, storage devices, files, etc.).

In other implementations, the user can choose to enter the backup interface directly from an operating system menu. In some implementations, the backup component can provide several icons or menus available in other locations within the user interface 600 or running applications, thereby providing several options for activating or launching the backup interface.

Figure 6B:
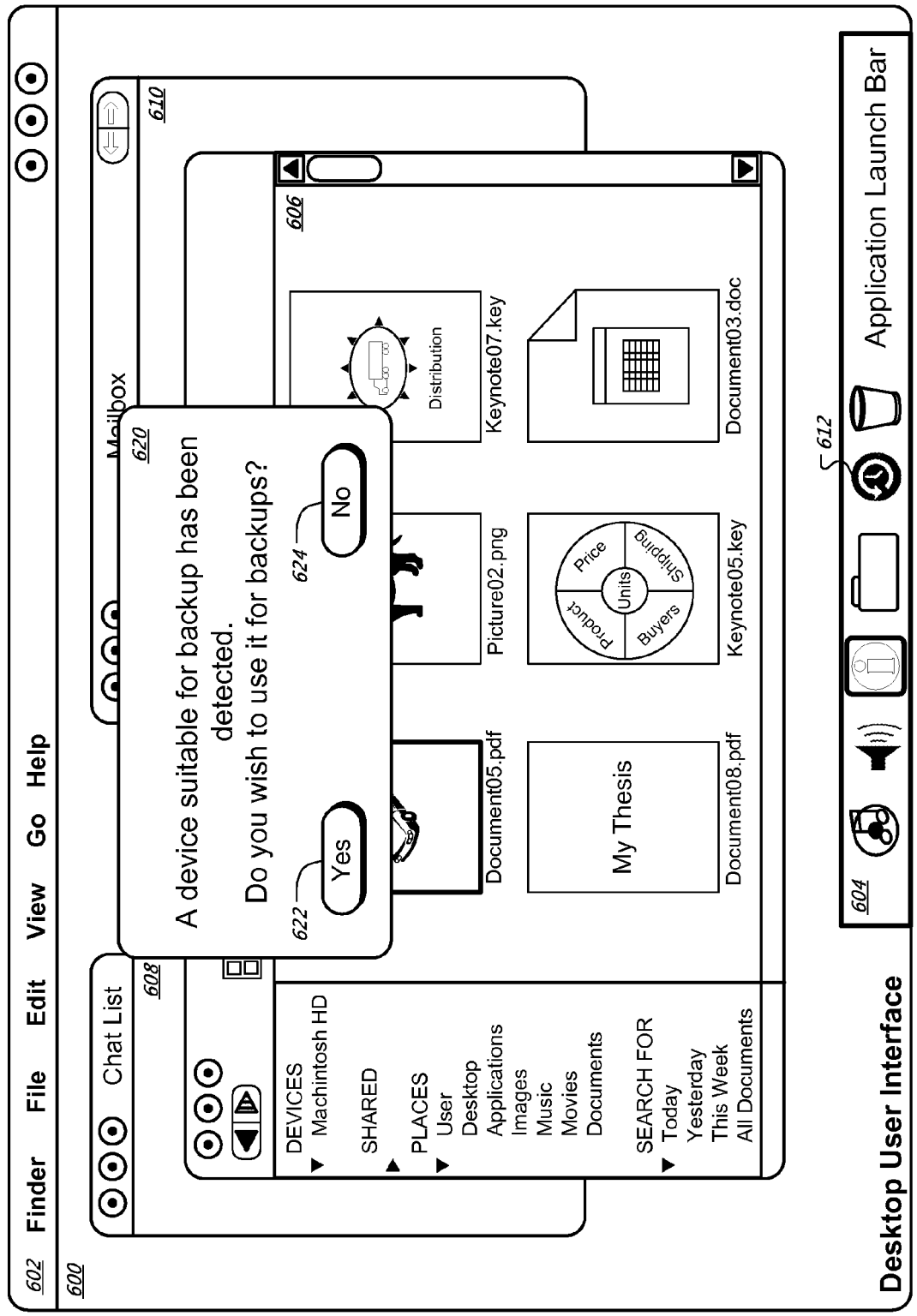
FIG. 6B shows the desktop user interface of FIG. 6A overlaid with a backup request dialog.

FIG. 6B shows the desktop user interface 600 of FIG. 6A overlaid with a backup request dialog 620. The backup request dialog 620 provides the user with the option to use a newly detected storage device for backup operations. In some implementations, the device is a storage media attached to a remote server (e.g., as shown in FIG. 4). The device can also be an external storage device, including without limitation a USB external hard drive, floppy drive, CD-ROM, or memory stick. In some implementations, the backup request dialog 620 offers information regarding the new device, such as the type of device, amount of storage space available, and the like.

Selection of a "yes" button 622 confirms that the backup component should store archive information from backup operations within the new storage device. In some implementations, the backup component can automatically be configured to store backup data to the new storage device, including, for example, default parameters for backup scheduling and data retention as well as configuring the new storage device (e.g., creating one or more disk images). Default preferences, in some implementations, can be used to enable a one-step setup of the new storage device.

In alternative implementations, selection of the "yes" button 622 opens a backup settings dialog to set preferences associated with backup to this device. Device preferences can include, for example, a size to allocate for archival purposes, a security code for accessing the archival location, or a drive label in the case of the creation of a disk image. In some implementations, selection of the storage device as a new archive storage location by activating the yes button 622 results in creating a framework for archive storage. For example, a new disk image containing a file system architecture could be allocated within the storage device to prepare it to accept backup data.

Selection of a "no" button 624 can close the dialog without choosing the new storage device as an archive storage location for backup operations. In some implementations, a postponement of decision, such as a button requesting to be prompted at a future time, can be available to provide the user with an opportunity to make the decision at a later time. There could also be available, in some implementations, an information button which, when selected, can provide the user with more details regarding the new storage device (e.g., name, type, location, storage capacity, etc.).

Figure 7:
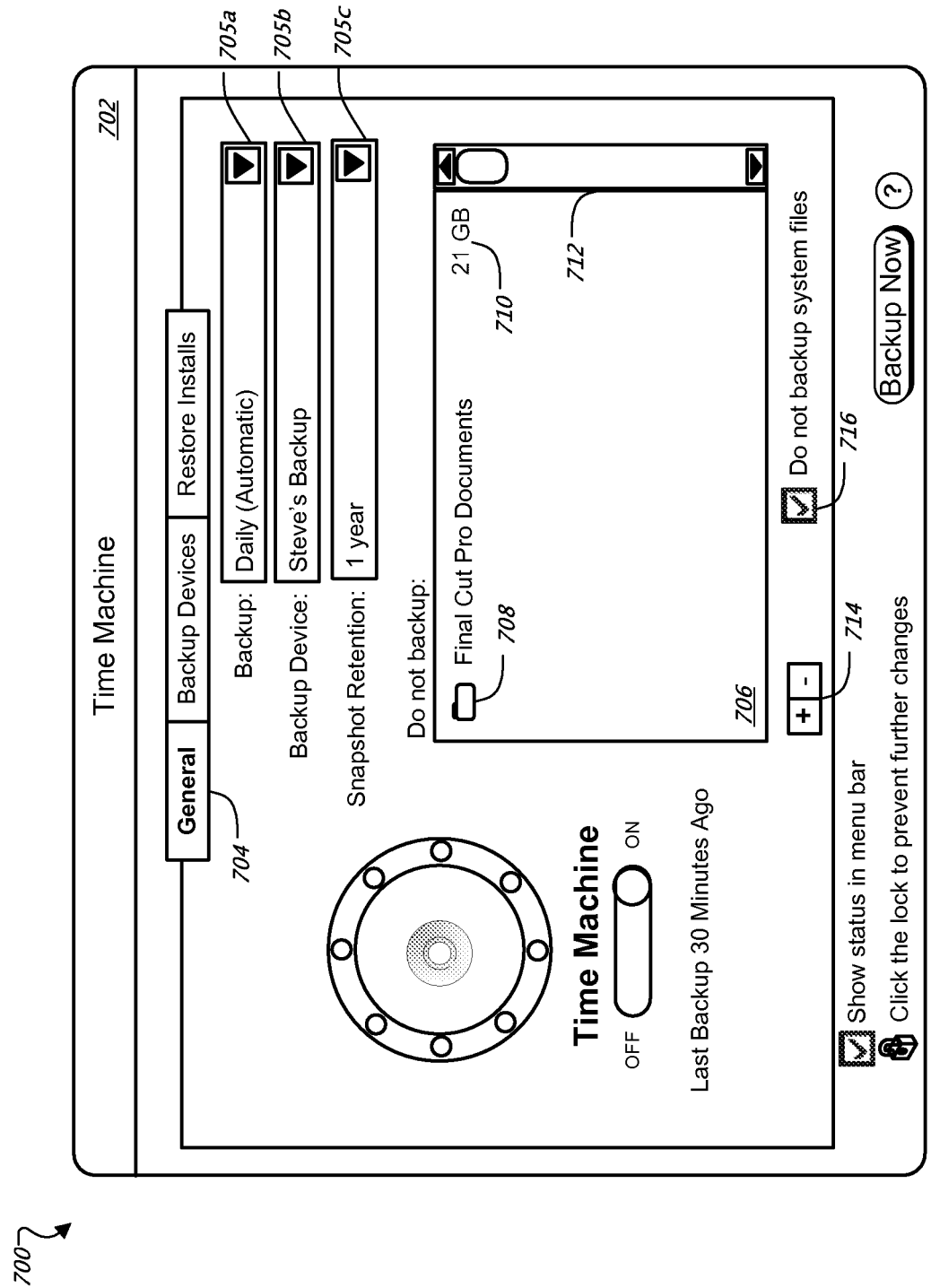
FIG. 7 is a screen shot depicting an example of a backup settings dialog.

FIG. 7 is a screen shot 700 depicting an example of a backup settings interface 702. In some implementations, the backup settings interface 702 is generated by a preference management engine (e.g., the preference management engine 214 of FIG. 2). In some implementations the backup settings interface 702 includes one or more tabs for switching between different types of backup settings. As shown in FIG. 7, the backup settings interface 702 includes a general settings tab 704, which is selected. Drop-down menus 705 provide the user with settings regarding the location, frequency, and retention length of the backup archives. In addition to options provided within the drop-down selection menus 705, the user can, in some implementations, manually input settings.

A first drop-down menu 705a sets the frequency of the backup operations. For example, the menu 705a is presently set to daily automatic backups. Backup frequency settings can include, e.g., daily (automatic), daily (prompted), weekly, biweekly, monthly, manual only, etc. In some implementations, the backup scheduling can also specify a particular time of day to run the backup operation (e.g., in the middle of the night). Alternatively, the backup scheduling, in various implementations, can be set to run backup operations during system idle time.

A second drop-down menu 705b specifies the storage device to use for backup operations. The menu 705b is presently set to Steve's Backup. Other backup devices can include a remote disk image (e.g., "drive X:"), an external storage device (e.g., "CD-ROM drive D:"), or an internal storage location. In some implementations, the storage device setting can be made through a user prompt when a new device is added to the system. For example, when the backup component recognizes a new storage device has been added to the system, the user can be prompted to specify whether to use that device for backup operations. In some implementations, more than one backup location can be specified. For example, a primary and secondary backup location could be set such that, if the primary backup location is not available during the next scheduled backup, the archive files could be located within the secondary backup location instead. In various implementations, the user can specify different storage devices for different types of elements, locations of data, or other distributions of the backup element list. For example, the user could specify that all photos and music be backed up to one storage device, while the rest of the data be backed up to a different storage device.

A third drop-down menu 705c establishes the length of snapshot retention. As used herein, a snapshot refers to a backup element stored in an archive that includes a backup of selected items or content as specified by the backup component 117. For example, each backup operation can generate snapshots of the data included in the backup. These snapshots can be presented to the user in the backup interface.

The menu 705c, as illustrated, is set to a retention length of one year. In other examples, the snapshot retention period can be set to one week, one month, three months, six months, five years, etc. The snapshot retention period establishes the point at which snapshots are eligible for deletion. For example, a snapshot retention length of one year can mean that snapshots over 365 days old can be subject to deletion under particular circumstances (e.g., low storage space, according to a specified schedule). A pruning operation, in some implementations, can be run periodically to remove snapshots that have dates beyond the specified retention time. For example, a pruning operation could occur on the same schedule as the backup (e.g., the time schedule specified within the drop-down menu 705a). In various implementations, the backup management engine 216 can manage the removal of expired snapshots.

In some implementations, the retention schedule can vary depending upon the type of data (e.g., a file) being included in the backup operation. For example, certain files or types of data elements are modified daily or multiple times throughout the day. The frequently modified data elements could be scheduled for a shorter retention period than elements which are rarely modified. In some implementations, rather than a time limitation, a specified number of versions of each element could be retained. For example, a user could specify that only the five most recent versions of each element be retained.

Within the backup settings interface 702, a user can also select particular data to exclude from backup operations. For example, a "do not backup" pane 706 can provide a user modifiable list of items to exclude from the backup operations. Specifically, the pane 706 contains a Final Cut Pro Documents folder 708 with a total size 710 of 21 gigabytes. The list of items within the pane 706 could contain specific applications and/or features (e.g., a "trash" application that manages deleted items), folders, individual files, and/or general categories (e.g. internet browser cookies, e-mail spam items). A scroll bar 712 allows the user to view additional items that do not fit within the pane 706.

A pair of add/delete buttons 714 can allow the user to include or remove items from the "do not backup" pane 706. For example, selecting the folder 708 and activating the delete button 714 removes the folder 708 from the "do not backup" pane 706. Selecting the add button, in another example, can launch a file navigation application to locate further items to exclude from backup operations.

A system file exclusion checkbox 716 provides the user with another method of excluding items from the backup operation. The checkbox 716 eliminates all system files from being archived in the backup operations. System files are files which the electronic device (e.g., personal computer, laptop, PDA, etc.) uses for system initialization, device drivers, and other lower level tasks. Generally, a user rarely if ever directly modifies a system file. In some implementations, exclusion of system files can be the default setting. In some implementations, when the checkbox 716 is selected, any previous backup versions of system files are removed from the backup archives to avoid any inconsistencies which could occur upon restoration.

Upon completion of setting the backup preferences, the user can select a "backup now" button 718 to initiate a backup operation using the new settings. In some implementations, selection of the backup now button 718 closes the backup settings interface 702. In various implementations, the new preference settings take effect during the next scheduled backup operation.

Figure 8:
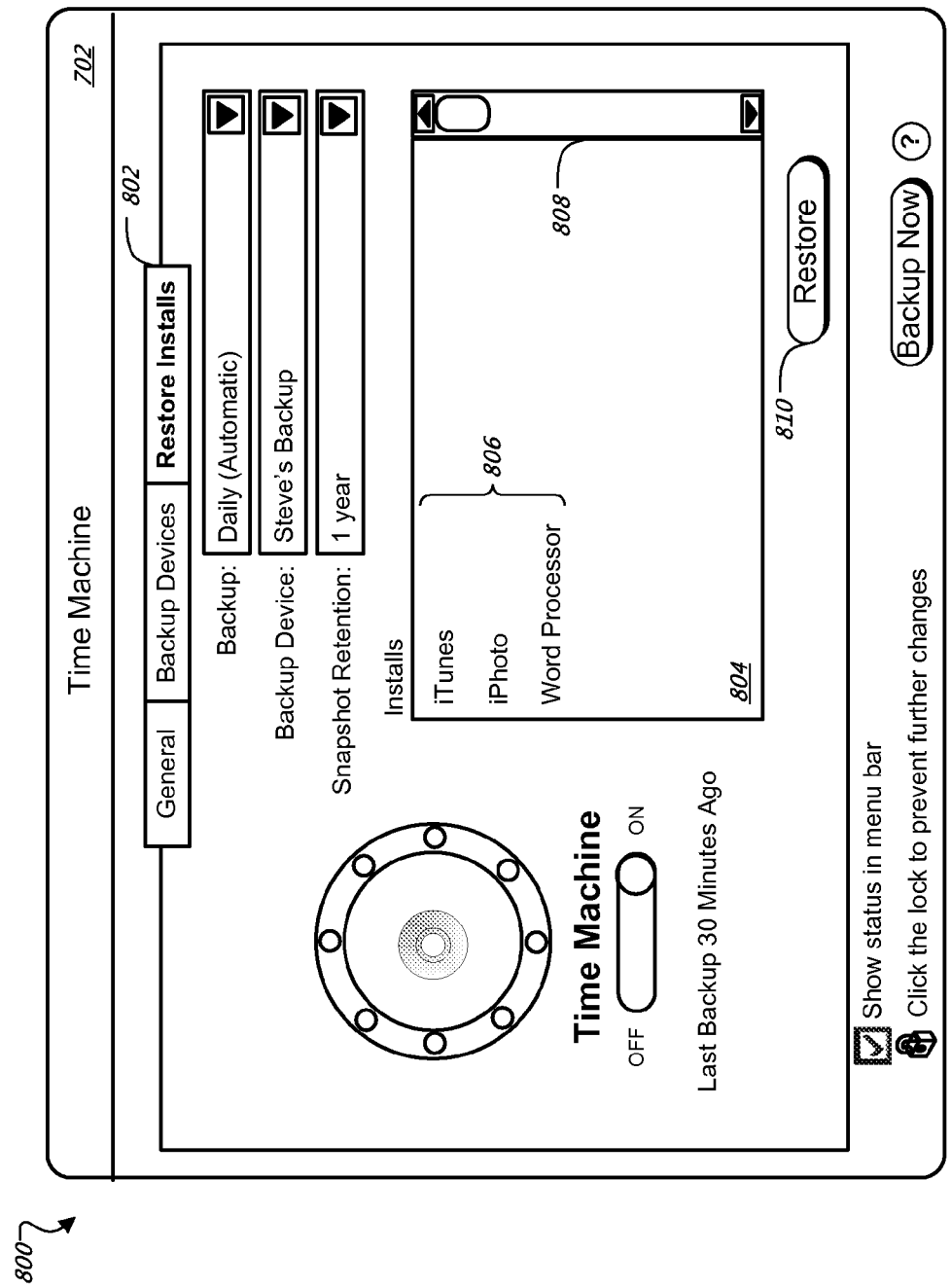
FIG. 8 is a screen shot depicting an example of a backup settings dialog for the restoration of application installations.

FIG. 8 is a screenshot 800 depicting an example of the backup settings interface 702 in which a "restore installs" tab 802 is selected. Within the backup settings interface 702, a user can view and select particular application installation files available for restoration. For example, an installs pane 804 can include a list of applications 806 (e.g., iTunes™ and iPhoto™ by Apple, Inc. of Cupertino, Calif. and a word processing application). The list of applications 806 within the pane 804 could contain any application for which backup component has captured installation files. For example, within a previous backup operation, the backup component 117 created archived copies of the installation files for the applications listed within the pane 804. In some implementations, the backup component 117 can identify and store installation files as a background task during an installation process.

In some implementations, the backup component recognizes these files as installation files because the user specifically selected application installations for backup within a similar setup dialog to the backup settings interface 702. In other implementations, the component recognizes types and/or groupings of files as installation files and generates the list of installations for the pane 804. A scroll bar 808 allows the user to view additional items which do not fit within the pane 804.

The user can select a restore button 810 to restore the installation of one or more applications 806 listed within the pane 804. For example, if the iTunes™ installation within the user's device has been deleted or becomes corrupted, rather than locating the installation disk for the application, the user can select the iTunes™ application from the list of applications 806 and activate the restore button 810 to re-install the iTunes™ application. In some implementations, selection of the restore button 810 copies the installation files to a known location where they can be activated for installation purposes. The installation routine can be activated itself through activating the restore button 810 in various implementations. In some implementations, the user will be prompted for verification before an application is installed using the restore button 810.

Figure 9:
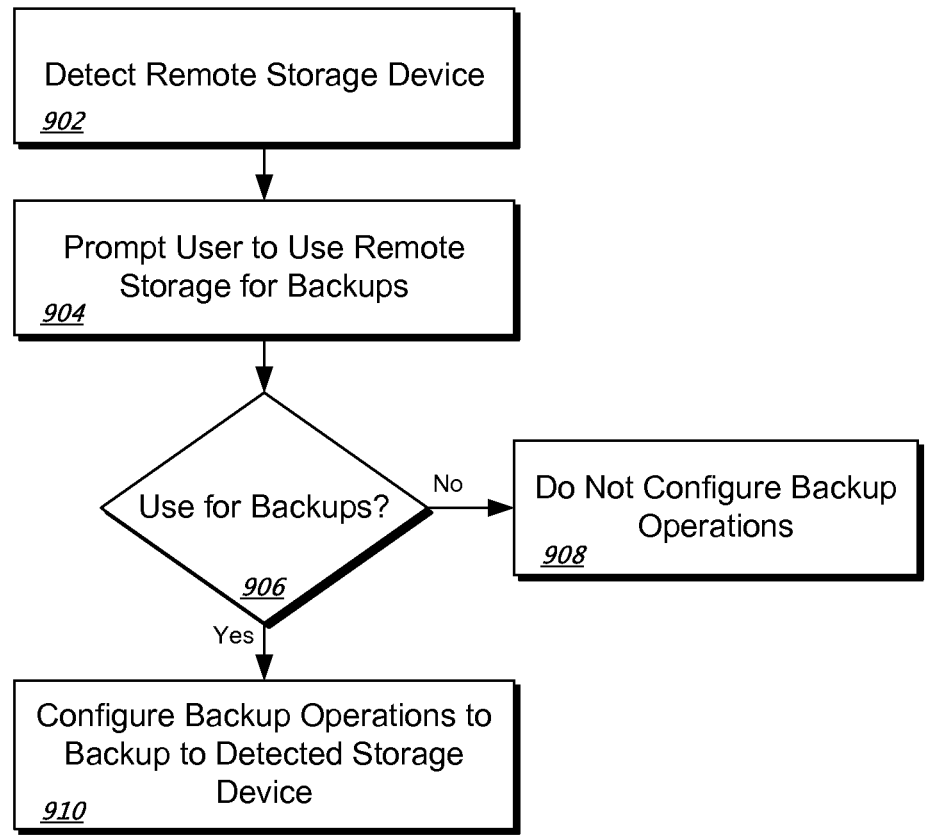
FIG. 9 is a flow diagram of an example method illustrating a remote storage device detection scenario.

FIG. 9 is a flow diagram of an example method 900 illustrating a remote storage device detection scenario. For convenience, the method 900 will be described with respect to a system that performs the method 900. The system detects (902) a remote storage device. In one example, the backup component 117 detects that a new storage device is available within the network connected to the electronic device running the backup component 117. In some implementations, the backup component 117 can verify that there is free space available within the new storage device. In some implementations, the backup component 117 can also verify that the detected storage device is compatible with a type of file system structure that can be used for archival storage.

The system prompts (904) the user to use the newly detected remote storage device for backup operations. For example, a pop-up dialog within a desktop user interface, as described with reference to FIG. 6B above, can prompt the user regarding use of the new storage device. In some implementations, the user prompt included details regarding the storage device, such as the device type, name, location, and/or size of space available.

If the user does not wish to use the new storage device for backups, the system does not configure (906) the new storage device for backup operations. In some implementations, the backup component will not prompt the user again regarding this particular storage device. In other implementations, the backup component can prompt the user regarding this storage device again whenever it becomes accessible or after a specified amount of time has elapsed from the previous prompt. For example, a USB disk drive could be plugged into a wireless base station intermittently. In this circumstance, each time the USB disk drive comes active on the network the backup component could prompt the user regarding its usage. In various implementations, a checkbox or other tool can be available to the user to instruct the backup component to stop prompting regarding a particular storage device.

If the user opts to use the new storage device for backups, the system configures (910) backup operations to save data archives to the storage device. For example, the preference management engine 214 can store the location of the newly detected storage device, along with default settings, for use during the next backup operation. In some implementations, the default settings within the preference management engine 214 are used without prompting the user for further details. This enables one-click setup of the storage location. In various implementations, the user can be prompted for further details regarding the storage device. For example, the user can be prompted to specify the amount of disk space or percentage of available disk space which can be allocated to backup operations. In some implementations, disk space within the remote storage device is allocated by creating a disk image dedicated to the backup operations of a particular user or a particular electronic device.

Figure 10:
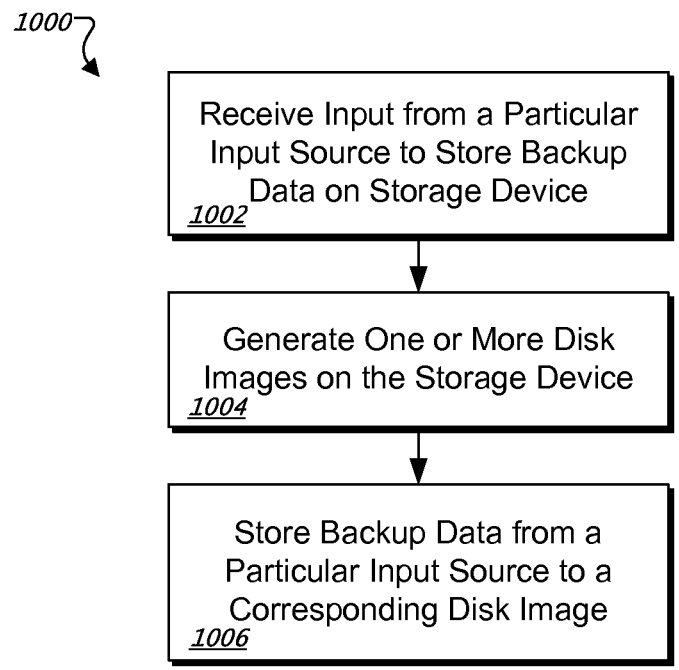
FIG. 10 is a flow diagram of an example method for setting up and using a disk image on a storage device for storing backup data.

FIG. 10 is a flow diagram of an example method 1000 for setting up and using a disk image on a storage device for storing archived data. For convenience, the method 1000 will be described with respect to a system that performs the method 1000. The system receives (1002) input from a particular input source (e.g., a computer 302) to store backup data on a storage device. For example, a user at the input source can specify a storage location using a preferences dialog such as the backup settings dialog illustrated in FIG. 7. In another example, the backup component can recognize the addition of a new storage device to the system and prompt the user of the input source regarding using the new storage device for storing backup data (e.g., as shown in FIG. 6B). In some implementations, the storage device is attached to a server on a network (e.g., as shown in FIG. 3). The storage device can also be attached, in various implementations, to a wireless base station (e.g., as shown in FIG. 4).

The system creates (1004) one or more disk images on the storage device. In some implementations, the disk imaging engine (e.g., the disk imaging engine 224 of FIG. 2) creates the one or more disk images on the storage device. For example, a disk image of a default size and drive identification, containing a file system architecture, can be created within a remote storage device for use as a backup data receptacle e.g., by a particular input source. More than one user, in some implementations, can use the same disk image to store backup data from the same input source. In some implementations, if another user has already gained access to a disk image on this storage device for backup purposes, a new disk image may not be created. The existing disk image associated with the input source can, in some implementations, be allocated for mirror purposes to the second user. In some implementations, each user of a particular input source is allocated a separate disk image within the storage device. For example, if one or more users of an input source encrypt or otherwise secure data archives, access to the disk image can be restricted to the particular user.

In some alternative implementations, the disk imaging engine is part of a server or other remote device associated with the storage device. In response to the backup component identifying an intention to use the storage device for backup operations, the disk imaging engine can perform the disk image creation as well as manage other disk images that have already been created or to be created in the future on the storage device.

The system stores (1006) backup data from a particular input source to a corresponding disk image. In some implementations, when the backup operation is either manually activated or scheduled to begin, the backup component 117 mounts the disk image within the storage device to prepare it for storing backup data associated with the backup operation. The backup capture engine 220, for example, can copy data items and elemental modifications of data items to the mounted disk image. In various implementations, the backup archives are stored in a file system structure. In some implementations, the backup component can mount more than one disk image, for example, when storing backup data associated with individual users having separate disk images.

Figure 11:
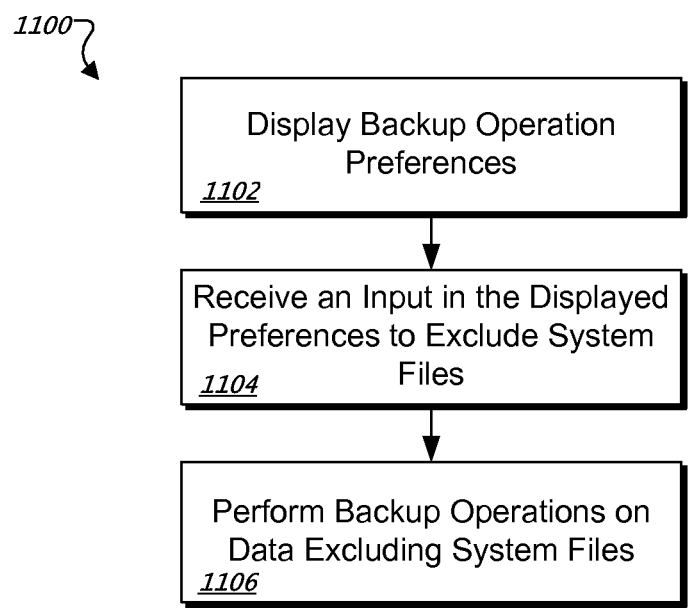
FIG. 11 is a flow diagram of an example method for excluding system files from a backup operation.

FIG. 11 is a flow diagram of an example method 1100 for excluding system files from a backup operation. For convenience, the method 1100 will be described with respect to a system that performs the method 1100. The system displays (1102) backup operation preferences. For example, backup operation preferences can be presented within a graphical user interface dialog, such as the backup settings interface 702 shown in FIG. 7. The backup operation preferences can include, for example, how frequently to perform backup operations, the option of where to store the archived data, how long to retain the archived data, and which data to include, and/or which data to exclude from backup operations. In some implementations, the preference management engine 214 generates the backup preferences display and/or stores the backup operation preferences. Backup operation preferences, in some examples, can be set on a per user basis or a per device basis.

The system receives input (1104) within the displayed preferences to exclude system files from the backup operation. For example, the displayed preferences can include a checkbox (e.g., checkbox 716) within the backup settings interface 702. The checkbox can selectably allow the user to exclude system files from backup operations. In response to a selection to exclude system files, the backup operation does not create archived copies of system files (e.g., boot information for the input source, device drivers, etc.) during subsequent backup operations. In some implementations, selection of this option also involves the removal of any system file archives which have already been saved (e.g., in prior backup operations).

The system performs (1106) backup operations on the data, excluding the system files. In some implementations, the user can chose to immediately begin a backup operation from within the backup settings interface. For example, the user can activate the "backup now" button 718 within the backup settings interface 702. Alternatively, the backup operations can begin during a default or user-specified time schedule. In addition to excluding the system files, in some implementations, the user has the option to exclude other data from backup operations. For example, the "do not backup" pane 706 within the backup settings interface 702 provides the user with the opportunity to list data (e.g., files, folders, applications, etc) which are to be excluded from backup operations.

Figure 12:
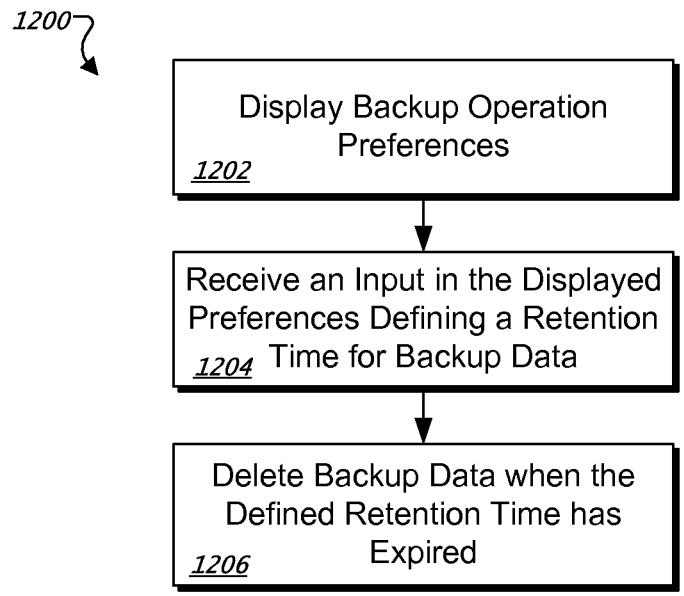
FIG. 12 is a flow diagram of an example method for setting and using a data retention period in a backup application.

FIG. 12 is a flow diagram of an example method 1200 for setting and using a data retention time in a backup application. For convenience, the method 1200 will be described with respect to a system that performs the method 1200. The system displays (1202) backup operation preferences. For example, backup operation preferences can be presented within a graphical user interface, such as the backup settings interface 702.

The backup operation preferences can include, for example, how frequently to perform backup operations, the option of where to store the archived data, how long to retain the archived data, and which data to include and/or which data to exclude from backup operations. In some implementations, the preference management engine 214 generates the backup preferences display and/or stores the backup operation preferences. Backup operation preferences, in some examples, can be set on a per user basis or a per device basis.

The system receives (1204) input within the displayed preferences to define a retention period for the backup archives. For example, menu selections such as the drop-down menu 705c within the backup settings interface 702 can allow the user to select a retention period for backup data. Options for retention period can include, for example, one day, one week, two weeks, one month, one year, etc. In addition to the options presented, in some implementations, any length of time can be manually provided by the user.

In some implementations, different retention periods can be set for different types of data. For example, frequently changing data such as a financial activity spreadsheet can be retained for a shorter period of time than other data elements. In some implementations, rather than a retention period, a maximum number of archive versions can be set. For example, the user could select that only four unique versions be retained for any given data element.

The system deletes (1206) data from the archives when the defined retention period has expired. In some implementations, the backup management engine 216 coordinates the removal of expired data according to expired snapshots. In some implementations, the storage location of the snapshot data is overwritten to remove any trace of the expired information. For example, as a security measure, a memory location can be overwritten with other data to hide what was once written there. In other implementations, the memory location is released. In some implementations, the user can be prompted for confirmation before any data elements are permanently deleted regardless of what retention period has been set.

In some implementations, data is only made available for deletion after the selected time has expired. For example, snapshots that have expired can be retained until some deletion event occurs. For example, deletion can be according to a specified schedule. Alternatively, deletion can be associated with the amount of space available on a particular storage device such that deletion occurs when a threshold minimum available storage space has been passed.

In some alternative implementations, rather than deleting a snapshot, the snapshot is combined with a more recent snapshot. For example, the backup management engine 216 can associate the expired snapshot with a more recent, and unchanged, snapshot rather than losing the archived version of the data element. In some implementations, association of a data element with a particular snapshot occurs within the element's metadata.

Figure 13:
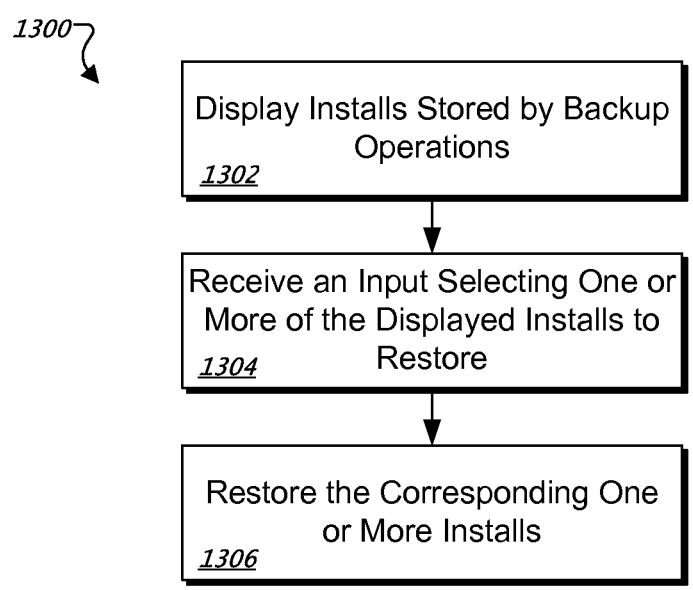
FIG. 13 is a flow diagram of an example method illustrating a restoration of application installations using an archival application.

FIG. 13 is a flow diagram of an example method 1300 illustrating a restoration of application installations using a backup application. For convenience, the method 1300 will be described with respect to a system that performs the method 1300. The system displays (1302) the application installation archives stored by the backup operations. For example, a graphical user interface dialog such as the backup settings interface 702 shown in FIG. 8 can list the installation archives.

In some implementations, the backup operations archive the application installation files by user request (e.g., within the preference settings). In one implementation, the backup component 117 can identify and store installation files as a background task during an installation process. In other implementations, the backup operations recognize particular data elements as belonging to an application's installation files. The backup management engine 216, for example, can track versions of application installation files. Archived application installation files can allow the user to reinstall damaged or missing software applications without requiring the installation disk, for example.

The system receives (1304) an input selecting one or more of the displayed application installations to restore. For example, a user could select iTunes™ and iPhoto™ from the list of applications 806 within the installation pane 804 of FIG. 8. While the iTunes™ and iPhoto™ installations are selected, the user can activate the restore button 810. In some implementations, installations are portrayed by their graphical user interface icon rather than or in addition to the application name. In some implementations, more than one version of the installation files for a particular application can be archived. For example, version 2.0 and version 2.5 of the same word processing application can be listed within the pane 804 so that a user can select a particular version of the application install to restore.

The system restores (1306) the selected installation(s). For example, the backup restoration engine 222 can retrieve the installation files for the selected application(s). In some implementations, the installation files are provided to the user so that the user can run the installation operation. For example, the backup restoration engine 222 can copy the installation files to a default or user-specified location or otherwise present the restored files to the user. The installation operation automatically activates, in various implementations, upon selection for restoration. The backup restoration engine 222, for example, begins the execution of the installation for the user. In some implementations, the user is prompted whether or not to automatically activate the installation operation. For example, a dialog can be presented to the user, asking the user whether or not the installations should be activated immediately.

In some circumstances, the application may already be installed. For example, the iPhoto™ application may be installed but damaged. In some implementations, the backup application checks for a backup installation before attempting to re-install the application. The system can prompt the user, in various implementations, to remove the current application installation if it exists before restoration. For example, the backup restoration engine 222 could first verify that the iPhoto™ application is not already installed within the system. If a current installation is detected, the user could be prompted to remove the active iPhoto™ installation. In some implementations, the backup component can automatically remove the present installation before installing the restored application files.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics techniques and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it could prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   identifying installations during install processes including identifying one or more files used to install an application on the computing device;

storing a backup of the identified installations including storing a backup of the identified one or more files used to install the application;

presenting one or more application installations stored by backup operations and available for reinstallation, each application installation including backup files associated with a particular application installation;

receiving a user selection of an installation to reinstall;

reinstalling the associated application using the backup files associated with the selected installation; and wherein the identifying and storing are performed as a background task by the computing device during installation of an application on the computing device.

2. The method of claim 1, where reinstalling the associated application includes performing an uninstall of a current version of the associated application prior to the reinstallation.

3. A non-transitory computer-readable medium including one or more sequences of instructions which, when executed by one or more processors, causes:

identifying installations during install processes including identifying one or more files used to install an application on the computing device;

storing a backup of the identified installations including storing a backup of the identified one or more files used to install the application;

presenting one or more application installations stored by backup operations and available for reinstallation, each application installation including backup files associated with a particular application installation;

receiving a user selection of an installation to reinstall;

reinstalling the associated application using the backup files associated with the selected installation; and wherein the identifying and storing are performed as a background task by the computing device during installation of an application on the computing device.

4. The non-transitory computer-readable medium of claim 3, where the instructions that cause reinstalling the associated application include instructions that cause performing an uninstall of a current version of the associated application prior to the reinstallation.

5. A system comprising:

one or more processors; and a non-transitory computer-readable medium including one or more sequences of instructions which, when executed by the one or more processors, causes:

identifying installations during install processes including identifying one or more files used to install an application on the computing device;

storing a backup of the identified installations including storing a backup of the identified one or more files used to install the application;

presenting one or more application installations stored by backup operations and available for reinstallation, each application installation including backup files associated with a particular application installation;

receiving a user selection of an installation to reinstall;

reinstalling the associated application using the backup files associated with the selected installation; and wherein the identifying and storing are performed as a background task by the computing device during installation of an application on the computing device.

6. The system of claim 5, where the instructions that cause reinstalling the associated application include instructions that cause performing an uninstall of a current version of the associated application prior to the reinstallation.

* * * * *